US009240679B2

(12) United States Patent
Jung et al.

(10) Patent No.: US 9,240,679 B2
(45) Date of Patent: Jan. 19, 2016

(54) ADAPTIVE OVERVOLTAGE PROTECTION CIRCUIT AND METHOD, AND POWER SYSTEM INCLUDING THE SAME

(75) Inventors: Il-young Jung, Bucheon (KR);
Byung-hak Ahn, Seoul (KR);
Youn-woong Chung, Bucheon (KR);
Moon-ho Choi, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 921 days.

(21) Appl. No.: 13/324,825

(22) Filed: Dec. 13, 2011

(65) Prior Publication Data
US 2012/0170165 A1    Jul. 5, 2012

(30) Foreign Application Priority Data
Jan. 3, 2011    (KR) .......................... 10-2011-0000293

(51) Int. Cl.
*H02H 9/04* (2006.01)
*H02H 3/20* (2006.01)
*H02H 1/06* (2006.01)
*H02M 1/34* (2007.01)
*H02M 1/32* (2007.01)

(52) U.S. Cl.
CPC . *H02H 1/06* (2013.01); *H02H 3/20* (2013.01);
*H02M 1/34* (2013.01); *H02M 1/32* (2013.01);
*H02M 2001/348* (2013.01)

(58) Field of Classification Search
CPC ............ H02H 1/06; H02H 3/20; G05F 1/571;
G05F 1/66; H02M 1/32; H02M 2001/348
USPC ............................................. 361/86, 78, 91.7
See application file for complete search history.

(56) References Cited

U.S. PATENT DOCUMENTS

| 3,916,262 | A | * | 10/1975 | Easter | H02H 3/20 327/50 |
| 5,243,625 | A | * | 9/1993 | Verbakel | G01R 19/16566 341/139 |
| 5,982,161 | A | * | 11/1999 | Nguyen | G05F 1/618 323/284 |
| 6,028,415 | A | * | 2/2000 | Nagai | G11C 5/141 320/137 |
| 6,052,307 | A | * | 4/2000 | Huber | G11C 16/26 327/52 |
| 6,069,471 | A | * | 5/2000 | Nguyen | G05B 13/021 323/271 |
| 6,140,860 | A | * | 10/2000 | Sandhu | G05F 3/245 327/513 |
| 6,266,220 | B1 | * | 7/2001 | Lahoud | H02H 3/207 361/104 |
| 6,353,403 | B1 | * | 3/2002 | Williams | H03L 3/00 341/144 |

(Continued)

OTHER PUBLICATIONS

Datasheet, "6A Voltage Mode Synchronous Buck PWM DC-DC Converter with Integrated Inductor 3-Pin VID Output Voltage Select," Enpiron, Inc., Sep. 18, 2009, hereafter referred to as "EN".*

*Primary Examiner* — Rexford Barnie
*Assistant Examiner* — Elim Ortiz
(74) *Attorney, Agent, or Firm* — Okamoto & Benedicto LLP

(57) ABSTRACT

An adaptive over-voltage protection circuit includes an over-voltage protection reference voltage provider and an over-voltage signal output unit. The over-voltage protection reference voltage provider provides a voltage of an over-voltage protection level higher than that of an over-voltage protection voltage corresponding to an output voltage supplied to a load from among a plurality of different over-voltage protection levels as an over-voltage protection reference voltage when the output voltage reaches a range of a rated voltage of the load. The over-voltage signal output unit outputs an over-voltage signal indicating an over-voltage by comparing the over-voltage protection voltage with the over-voltage protection reference voltage.

20 Claims, 11 Drawing Sheets

(56) References Cited

U.S. PATENT DOCUMENTS

| | | | | |
|---|---|---|---|---|
| 6,680,642 B2* | 1/2004 | Edell | G05F 1/10 | 323/312 |
| 6,728,133 B2* | 4/2004 | Shimizu | G11C 8/12 | 365/185.03 |
| 6,969,976 B1* | 11/2005 | Broach | H02M 3/156 | 323/222 |
| 7,036,053 B2* | 4/2006 | Zumkehr | G11C 7/1051 | 714/709 |
| 7,045,992 B1* | 5/2006 | Silva | H02M 1/36 | 323/222 |
| 7,248,640 B2* | 7/2007 | Gorecki | H04L 27/08 | 375/287 |
| 7,299,380 B2* | 11/2007 | Miller | G06F 11/24 | 714/25 |
| 7,315,153 B2* | 1/2008 | Tazawa | H02M 3/1584 | 323/272 |
| 7,489,121 B2* | 2/2009 | Qiu | H02M 3/156 | 323/222 |
| 7,541,795 B1* | 6/2009 | Smith | H02M 1/32 | 323/283 |
| 7,598,715 B1* | 10/2009 | Hariman | H02M 3/1588 | 323/222 |
| 7,646,382 B2* | 1/2010 | Chapuis | G06F 1/26 | 345/204 |
| 7,720,141 B2* | 5/2010 | Fang | H04L 25/4906 | 375/233 |
| 7,853,842 B2* | 12/2010 | Kim | G11C 5/063 | 324/601 |
| 8,089,813 B2* | 1/2012 | Dreps | G11C 5/04 | 365/185.2 |
| 8,120,346 B2* | 2/2012 | Ostrom | H02M 3/156 | 323/272 |
| 8,143,920 B1* | 3/2012 | Mattos | H03F 1/52 | 324/123 C |
| 8,710,767 B2* | 4/2014 | Chen | H05B 33/0827 | 315/297 |
| 8,766,709 B2* | 7/2014 | Kim | G11C 5/147 | 327/143 |
| 2002/0078615 A1* | 6/2002 | Danner | F41A 19/58 | 42/69.01 |
| 2002/0130645 A1* | 9/2002 | Tsai | G05F 1/24 | 323/274 |
| 2005/0029872 A1* | 2/2005 | Ehrman | H02J 1/08 | 307/11 |
| 2005/0259774 A1* | 11/2005 | Garlepp | H04L 1/20 | 375/355 |
| 2006/0120177 A1* | 6/2006 | Shin | G11C 11/417 | 365/189.09 |
| 2008/0088254 A1* | 4/2008 | Yang | H05B 33/0815 | 315/247 |
| 2009/0261795 A1* | 10/2009 | Tang | H02M 3/1584 | 323/283 |
| 2010/0001703 A1* | 1/2010 | Williams | H02M 3/1584 | 323/283 |
| 2010/0033136 A1* | 2/2010 | Yang | H02J 7/0072 | 320/140 |
| 2010/0072969 A1* | 3/2010 | Gray | H02M 3/156 | 323/284 |
| 2012/0013317 A1* | 1/2012 | Morino | G05F 1/565 | 323/280 |
| 2012/0105155 A1* | 5/2012 | Odagiri | H03F 3/217 | 330/207 A |
| 2012/0127151 A1* | 5/2012 | Murakami | G09G 3/3611 | 345/212 |
| 2012/0147505 A1* | 6/2012 | Hooker | G01R 31/028 | 361/15 |
| 2013/0063105 A1* | 3/2013 | Nishida | H02M 3/156 | 323/271 |

* cited by examiner

FIG. 8

| TIME | sig1 | sig2 | sig3 | sig4 | sig5 | sig6 | sig7 | sig8 | out1 | out2 | OVPL | OVPR | OV |
|---|---|---|---|---|---|---|---|---|---|---|---|---|---|
| t0 | L | H | L | H | L | L | L | L | OVPL1 | OVPL1 | OVPL1 | OVPL4 | L |
| t0-t1 | L | H | L | H | L | L | L | L | OVPL1 | OVPL1 | OVPL1 | OVPL4 | L |
| t1-t2 | L | L | H | H | H | H | L | L | OVPL2 | OVPL2 | OVPL2 | OVPL4 | L |
| t2-t3 | L | H | L | H | L | H | L | L | OVPL2 | OVPL2 | OVPL2 | OVPL4 | L |
| t3-t4 | L | L | H | H | H | H | H | L | OVPL2 | OVPL3 | OVPL3 | OVPL4 | L |
| t4-t5 | L | H | L | L | L | H | H | L | OVPL2 | OVPL3 | OVPL3 | OVPL4 | L |
| t5-t6 | H | H | L | L | L | H | H | L | OVPL2 | OVPL3 | OVPL3 | OVPL4 | L |
| t6- | H | L | L | L | L | H | H | L | OVPL2 | OVPL3 | OVPL3 | OVPL4 | H |

FIG. 12

| TIME | sig1 | sig2 | sig3 | sig4 | sig5 | sig6 | sig7 | sig8 | out1 | out2 | OVPL | OVPR | OV |
|---|---|---|---|---|---|---|---|---|---|---|---|---|---|
| t0 | L | H | H | H | L | L | L | L | OVPL1 | OVPL1 | OVPL1 | OVPL4 | L |
| t0-t1 | L | H | H | H | L | L | L | L | OVPL1 | OVPL1 | OVPL1 | OVPL4 | L |
| t1-t2 | L | L | L | H | H | H | L | L | OVPL2 | OVPL2 | OVPL2 | OVPL4 | L |
| t2-t3 | L | H | H | H | L | H | L | L | OVPL2 | OVPL2 | OVPL2 | OVPL4 | L |
| t3-t4 | H | H | H | L | H | H | H | L | OVPL2 | OVPL3 | OVPL3 | OVPL4 | L |
| t4-t5 | H | H | H | L | H | H | H | L | OVPL2 | OVPL3 | OVPL3 | OVPL3 | L |
| t5-t6 | L | H | H | L | H | H | H | L | OVPL2 | OVPL3 | OVPL3 | OVPL3 | L |
| t6-t7 | H | H | H | L | H | H | H | L | OVPL2 | OVPL3 | OVPL3 | OVPL3 | L |
| t7- | H | L | H | L | H | H | H | L | OVPL2 | OVPL3 | OVPL3 | OVPL3 | H |

ADAPTIVE OVERVOLTAGE PROTECTION CIRCUIT AND METHOD, AND POWER SYSTEM INCLUDING THE SAME

CROSS-REFERENCE TO RELATED APPLICATIONS

This application claims the benefit of Korean Patent Application No. 10-2011-0000293, filed on Jan. 3, 2011, in the Korean Intellectual Property Office, the disclosure of which is incorporated herein in its entirety by reference.

BACKGROUND

The inventive concept relates to an adaptive over-voltage protection circuit and a power system including the same, and more particularly, to an adaptive over-voltage protection circuit for adjusting an over-voltage protection reference voltage according to a load state and a power system including the same.

In general, a power supply device for supplying an output voltage to a load is used together with an over-voltage protection circuit to protect the load and the power supply device. The over-voltage protection circuit receives an over-voltage protection voltage, which corresponds to the output voltage, and an over-voltage protection reference voltage, compares the over-voltage protection voltage with the over-voltage protection reference voltage, and if a voltage level of an over-voltage protection signal exceeds that of the over-voltage protection reference voltage, generates a signal for stopping a supply of the output voltage. However, the over-voltage protection reference voltage may vary according to the magnitude of the load. Thus, if the magnitude of the load to be connected to the power supply device is not determined, the over-voltage protection reference voltage needs to be generated separately from the power supply device to meet the magnitude of the load. Otherwise, when the over-voltage protection reference voltage generated in the power supply device is used regardless of the magnitude of the load, an over-voltage state may not be recognized.

SUMMARY

The inventive concept provides an adaptive over-voltage protection circuit and method for adjusting an over-voltage protection reference voltage according to a load state.

The inventive concept also provides a power system including the adaptive over-voltage protection circuit.

According to an aspect of the inventive concept, there is provided an adaptive over-voltage protection circuit including an over-voltage protection reference voltage provider and an over-voltage signal output unit. The over-voltage protection reference voltage provider provides a voltage of an over-voltage protection level higher than that of an over-voltage protection voltage corresponding to an output voltage supplied to a load from among a plurality of different over-voltage protection levels as an over-voltage protection reference voltage when the output voltage reaches a range of a rated voltage of the load. The over-voltage signal output unit outputs an over-voltage signal indicating an over-voltage by comparing the over-voltage protection voltage with the over-voltage protection reference voltage.

The over-voltage protection reference voltage may be determined as a voltage of an over-voltage protection level higher than and closest or second closest to that of the over-voltage protection voltage from among the plurality of different over-voltage protection levels when the output voltage reaches the range of the rated voltage.

The over-voltage protection reference voltage provider may include a first comparison unit, a second comparison unit, a clock generator, and a level output unit. The first comparison unit may receive a feedback voltage corresponding to the output voltage and compare the feedback voltage with a feedback reference voltage. The second comparison unit may compare the over-voltage protection voltage with a voltage of an over-voltage protection level currently output from the level output unit among the plurality of over-voltage protection levels. The clock generator may generate a clock signal based on an output signal of the first comparison unit and an output signal of the second comparison unit. The level output unit may sequentially output the plurality of over-voltage protection levels one-by-one in response to the clock signal.

The over-voltage protection reference voltage provider may further include an over-voltage protection reference voltage output unit for outputting a voltage of an over-voltage protection level currently output from the level output unit as the over-voltage protection reference voltage when the feed voltage is higher than the feedback reference voltage while outputting a voltage of the highest over-voltage protection level among the plurality of over-voltage protection levels as the over-voltage protection reference voltage.

The clock generator may generate the clock signal to have a rising or falling edge whenever the over-voltage protection voltage is higher than a voltage of an over-voltage protection level currently output from the level output unit. The clock generator may also generate the clock signal to have a rising or falling edge when the feedback voltage is higher than the feedback reference voltage. Alternatively, the clock generator may generate the clock signal not to have a rising or falling edge any more when the feedback voltage is higher than the feedback reference voltage.

The level output unit may include a clock counter and a multiplexer. The clock counter may receive the clock signal and output a clock count signal by counting clocks of the clock signal. The multiplexer may receive the clock count signal and the plurality of over-voltage protection levels and output a voltage of an over-voltage protection level corresponding to the clock count signal among the plurality of over-voltage protection levels.

According to another aspect of the inventive concept, there is provided an adaptive over-voltage protection method including: a reference voltage providing operation of providing a voltage of an over-voltage protection level higher than that of an over-voltage protection voltage corresponding to an output voltage supplied to a load from among a plurality of different over-voltage protection levels as an over-voltage protection reference voltage when the output voltage reaches a range of a rated voltage of the load; and an over-voltage signal outputting operation of outputting an over-voltage signal indicating an over-voltage by comparing the over-voltage protection voltage with the over-voltage protection reference voltage.

The reference voltage providing operation may include: a preparation operation of receiving the over-voltage protection voltage and a feedback voltage corresponding to the output voltage and generating the plurality of over-voltage protection levels and a feedback reference voltage; an initialization operation of setting the lowest one of the plurality of over-voltage protection levels as a comparison level; a first comparison operation of comparing the feedback voltage with the feedback reference voltage; a second comparison operation of comparing the over-voltage protection voltage with a voltage of the over-voltage protection level set as the comparison level; a level resetting operation of resetting the second lowest one of the plurality of over-voltage protection levels as the comparison level; and a determination operation of determining a voltage of the over-voltage protection level set as the comparison level, as the over-voltage protection reference voltage.

After the first comparison operation, if the feedback voltage is higher than the feedback reference voltage, proceeding to the determination operation, and if the feedback voltage is lower than the feedback reference voltage, the adaptive over-voltage protection method may proceed to the second comparison operation, and after the second comparison operation, if the over-voltage protection voltage is higher than the voltage of the over-voltage protection level set as the comparison level, proceeding to the level resetting operation, and if the over-voltage protection voltage is lower than the voltage of the over-voltage protection level set as the comparison level, the adaptive over-voltage protection method may proceed to the first comparison operation.

According to another aspect of the inventive concept, there is provided a power system including a power supply unit, an over-voltage protection voltage generator, a feedback voltage generator, and an adaptive over-voltage protection circuit. The power supply unit generates an output voltage supplied to a load. The over-voltage protection voltage generator is connected between the output voltage and a ground voltage and generates an over-voltage protection voltage corresponding to the output voltage. The feedback voltage generator is connected between the load and the ground voltage and generates a feedback voltage corresponding to the output voltage. The adaptive over-voltage protection circuit includes an over-voltage protection reference voltage provider and an over-voltage signal output unit. The over-voltage protection reference voltage provider receives the over-voltage protection voltage and the feedback voltage and provides a voltage of an over-voltage protection level higher than that of the over-voltage protection voltage from among a plurality of different over-voltage protection levels as an over-voltage protection reference voltage when the feedback voltage is higher than a feedback reference voltage. The over-voltage signal output unit outputs an over-voltage signal indicating an over-voltage by comparing the over-voltage protection voltage with the over-voltage protection reference voltage.

BRIEF DESCRIPTION OF THE DRAWINGS

Exemplary embodiments of the inventive concept will be more clearly understood from the following detailed description taken in conjunction with the accompanying drawings in which:

FIG. 8 is a table showing transitions of signals of the circuit diagrams of FIGS. 5 and 6 according to the graphs of FIG. 7;

FIG. 12 is a table showing transitions of signals of the circuit diagrams of FIGS. 10 and 6 according to the graphs of FIG. 11;

DETAILED DESCRIPTION OF THE EMBODIMENTS

Figure 1:
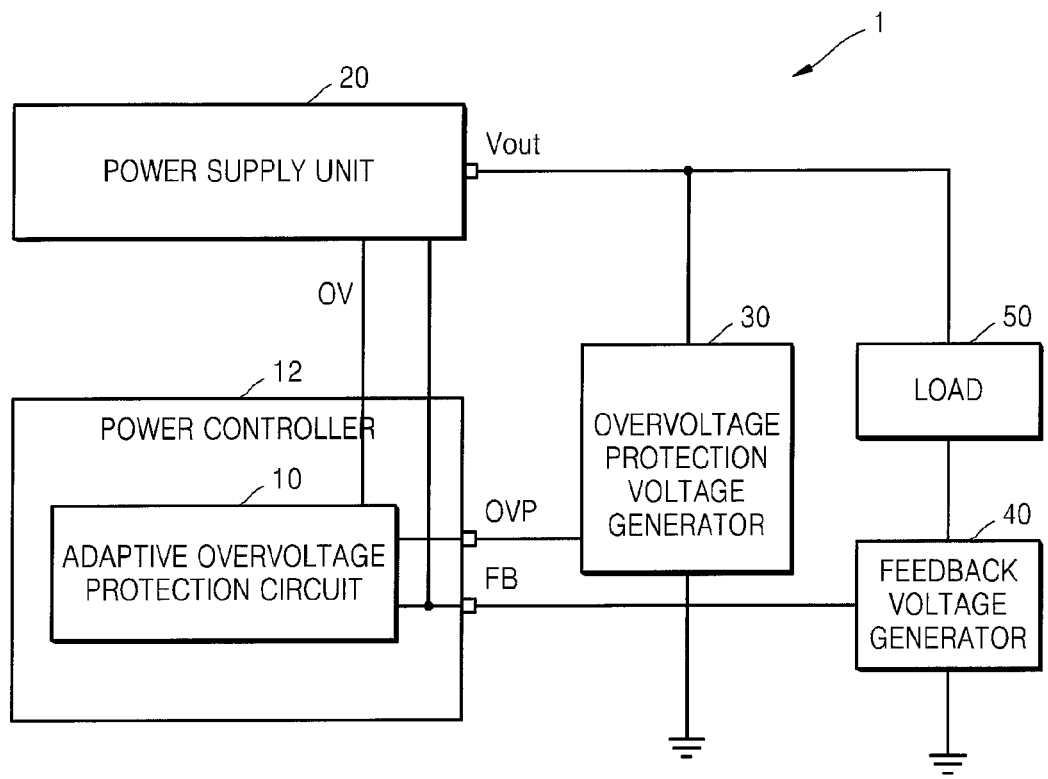
FIG. 1 is a block diagram of a power system according to an exemplary embodiment of the inventive concept.

Embodiments disclosed in the specification are provided to more fully describe the inventive concept to those of ordinary skill in the art. Embodiments of the inventive concept may be implemented in various forms and should not be analyzed as being limited to the embodiments described in the specification.

The inventive concept may allow various kinds of change or modification and various changes in form, and specific embodiments will be illustrated in drawings and described in detail in the specification. However, it should be understood that the specific embodiments do not limit the inventive concept to a specific disclosing form but include every modified, equivalent, or replaced one within the spirit and technical scope of the inventive concept.

Although terms, such as 'first' and 'second', can be used to describe various elements, the elements cannot be limited by the terms. The terms can be used to classify a certain element from another element. For example, a first element can be named a second element without leaving from the right scope of the inventive concept, and likely the second element can be named the first element.

When it is described that a certain element is 'connected' or 'linked' to another element, it should be understood that the certain element may be connected or linked to another element directly or via another element in the middle. In contrast, when a certain element is 'directly connected' or 'directly linked' to another element, it should be understood that any other element does not exist in the middle. Other expressions for describing a relationship between elements, i.e., 'between' and 'directly between' and 'neighboring' and 'directly neighboring,' should be understood in the same way.

The terminology used in the application is used only to describe specific embodiments and does not have any intention to limit the inventive concept. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

All terms used herein including technical or scientific terms have the same meaning as those generally understood by those of ordinary skill in the art unless they are defined differently. It should be understood that terms generally used, which are defined in a dictionary, have the same meaning as in a context of related technology, and the terms are not understood as ideal or excessively formal meaning unless they are clearly defined in the application.

The inventive concept will now be described more fully with reference to the accompanying drawings, in which exemplary embodiments of the inventive concept are shown. Like reference numerals in the drawings denote like elements, and thus their repetitive description will be omitted.

FIG. 1 is a block diagram of a power system 1 according to an exemplary embodiment of the inventive concept.

Referring to FIG. 1, the power system 1 includes a power supply unit 20 and a power controller 12.

The power supply unit 20 may be a device for supplying power to a load 50. The power supply unit 20 may supply an output voltage Vout to the load 50. The power supply unit 20 may include all devices for supplying power to the load 50. For example, the power supply unit 20 may include a Direct Current (DC)-to-DC converter, an Alternating Current (AC)-to-DC converter, a DC-to-AC converter, an AC-to-AC converter, and a generator.

The output voltage Vout may be a DC voltage. Alternatively, the output voltage Vout output from the power supply unit 20 may be an AC voltage.

The load 50 may be a resistive load or a load including a diode. For example, the load 50 may be a resistive load, such as a Cold Cathode Fluorescent Lamp (CCFL). The load 50 may be a load including a diode, such as a Light Emitting Diode (LED). A plurality of LEDs may be connected in series to be used as a Liquid Crystal Display (LCD) backlight. However, the inventive concept is not limited to a type of the load 50.

The load 50 has a rated voltage and a rated current suitable for the load 50. The rated voltage and the rated current respectively are a reference voltage and a reference current, which need to be supplied to maintain a normal operation of the load 50 and may vary according to the magnitude or type of the load 50. In common, the rated voltage and the rated current have a predetermined range. For example, a range of the rated voltage may be 200 V to 240 V. A predetermined value, e.g., 220 V, within the range may be called the rated voltage. In this case, 240 V may be called an upper limit voltage, and 200 V may be called a lower limit voltage.

The upper limit voltage may vary according to the rated voltage of the load 50. For example, the upper limit voltage may be set to about 55 V when the rated voltage of the load 50 is about 50 V, and the upper limit voltage may be set to about 44 V when the rated voltage of the load 50 is about 40 V. If the output voltage Vout is higher than the upper limit voltage, the power supply unit 20 and/or the load 50 may be damaged.

The power controller 12 may provide a control signal for controlling the power supply unit 20 to the power supply unit 20. For example, the power controller 12 may control an operation of the power supply unit 20, such as start, end, stop, or restart of the power supply unit 20. The power controller 12 may increase or decrease the output voltage Vout. The power controller 12 may be provided in a form of a separate Integrated Circuit (IC) chip. The power controller 12 may be included in the power supply unit 20.

The power controller 12 may include an adaptive over-voltage protection circuit 10. Although the adaptive over-voltage protection circuit 10 is included in the power controller 12 and is used together with the power supply unit 20 in FIG. 1, the inventive concept is not limited thereto. If necessary, the adaptive over-voltage protection circuit 10 may be used in another form.

The adaptive over-voltage protection circuit 10 receives an over-voltage protection voltage OVP and a feedback voltage FB and outputs an over-voltage signal OV to the power supply unit 20. The adaptive over-voltage protection circuit 10 may generate the over-voltage signal OV by sensing that the output voltage Vout is higher than the upper limit voltage. To do this, the adaptive over-voltage protection circuit 10 may set an over-voltage protection reference voltage and provide the over-voltage signal OV indicating an over-voltage state to the power supply unit 20 when the over-voltage protection voltage OVP is higher than the over-voltage protection reference voltage. The over-voltage protection reference voltage may correspond to the upper limit voltage, and the over-voltage protection voltage OVP may correspond to the output voltage Vout. The adaptive over-voltage protection circuit 10 will be described in detail with reference to FIGS. 2 to 12 below.

The over-voltage signal OV may be provided to the power supply unit 20. The power supply unit 20 may receive the over-voltage signal OV and stop supplying power to the load 50 when the over-voltage signal OV indicates the over-voltage state. The over-voltage signal OV may be provided to the power supply unit 20 in a form of a control signal through the power controller 12 instead of being directly provided to the power supply unit 20 by the adaptive over-voltage protection circuit 10.

The power system 1 may further include an over-voltage protection voltage generator 30 and a feedback voltage generator 40.

The over-voltage protection voltage generator 30 is connected between the output voltage Vout and a ground voltage GND and generates the over-voltage protection voltage OVP corresponding to the output voltage Vout. That is, the over-voltage protection voltage OVP increases if the output voltage Vout increases, and the over-voltage protection voltage OVP decreases if the output voltage Vout decreases. The over-voltage protection voltage OVP may be a DC voltage, and even if the output voltage Vout is an AC voltage, the over-voltage protection voltage OVP may be a DC voltage corresponding to a maximum value or an effective value of the AC output voltage Vout. The over-voltage protection voltage OVP may be directly proportional to the output voltage Vout. The over-voltage protection voltage generator 30 will be described in detail with reference to FIG. 13 below.

The feedback voltage generator 40 is connected between the load 50 and the ground voltage GND and generates the feedback voltage FB corresponding to the output voltage Vout. That is, the feedback voltage FB goes high if the output voltage Vout goes high, and the feedback voltage FB goes low if the output voltage Vout goes low. The feedback voltage FB may be proportional to the output voltage Vout according to the load 50 to which the output voltage Vout is supplied. The feedback voltage FB may be a DC voltage, and even if the output voltage Vout is an AC voltage, the feedback voltage FB may be a DC voltage corresponding to a maximum value or an effective value of the AC output voltage Vout. The feedback voltage FB will be described in detail with reference to FIG. 14 below.

The feedback voltage FB may be provided to the adaptive over-voltage protection circuit 10. The adaptive over-voltage protection circuit 10 may sense that the output voltage Vout reaches the range of the rated voltage by comparing the feedback voltage FB with the feedback reference voltage.

The feedback voltage FB may also be provided to the power supply unit 20. The power supply unit 20 may adjust the output voltage Vout in correspondence to the feedback voltage FB. For example, if the feedback voltage FB is higher than an arbitrary reference voltage, the power supply unit 20 may decrease the output voltage Vout, and if the feedback voltage FB is lower than the arbitrary reference voltage, the power supply unit 20 may increase the output voltage Vout. The feedback voltage FB may be provided to the power supply unit 20 in a form of a control signal through the power controller 12 instead of being directly provided to the power supply unit 20.

Figure 2:
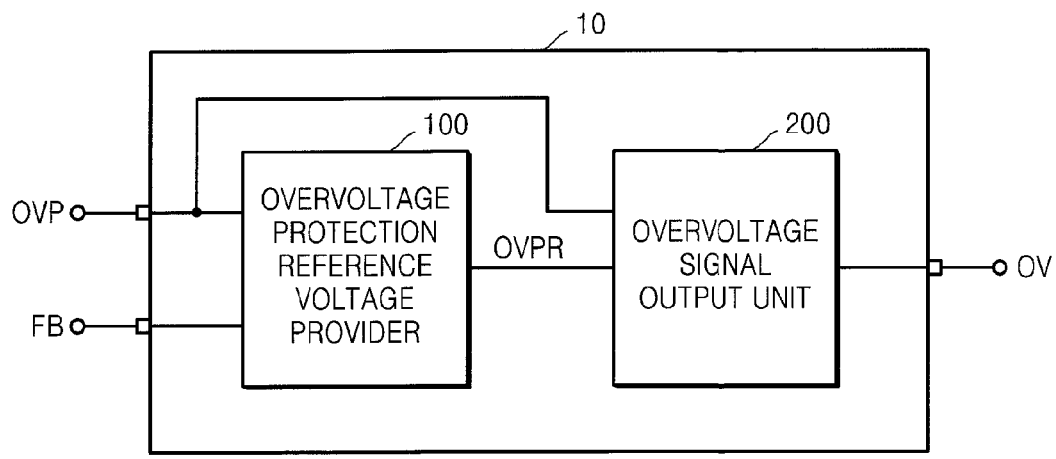
FIG. 2 is a block diagram of an adaptive over-voltage protection circuit according to an exemplary embodiment of the inventive concept.

FIG. 2 is a block diagram of the adaptive over-voltage protection circuit 10 according to an exemplary embodiment of the inventive concept.

Referring to FIGS. 1 and 2, the adaptive over-voltage protection circuit 10 includes an over-voltage protection reference voltage provider 100 and an over-voltage signal output unit 200.

The over-voltage protection reference voltage provider 100 provides a voltage of an over-voltage protection level higher than that of the over-voltage protection voltage OVP corresponding to the output voltage Vout from among a plurality of over-voltage protection levels OVPL1 to OVPLN (refer to FIG. 3) as an over-voltage protection reference voltage OVPR when the output voltage Vout supplied to the load 50 reaches the range of the rated voltage. The over-voltage protection reference voltage OVPR is provided to the over-voltage signal output unit 200.

The plurality of over-voltage protection levels OVPL1 to OVPLN having different values may be previously set in the adaptive over-voltage protection circuit 10 or the power controller 12. An over-voltage protection level indicates a voltage level in the specification. The plurality of over-voltage protection levels OVPL1 to OVPLN may have evenly distributed voltage values, e.g., 1 V, 2 V, 3 V, 4 V, and 5 V. If necessary, the plurality of over-voltage protection levels OVPL1 to OVPLN may have non-evenly distributed voltage values, e.g., 3 V, 3.2 V, 3.5 V, 3.9 V, 4.4 V, and 5.0 V. For example, the plurality of over-voltage protection levels OVPL1 to OVPLN may be arbitrary voltage values between voltage values of common power sources VDD and VSS for driving the adaptive over-voltage protection circuit 10.

The over-voltage protection reference voltage OVPR is a reference voltage for indicating an over-voltage and may correspond to the upper limit voltage. The over-voltage protection reference voltage OVPR may be a voltage of an over-voltage protection level higher than that of the over-voltage protection voltage OVP from among the plurality of over-voltage protection levels OVPL1 to OVPLN when the output voltage Vout reaches the range of the rated voltage. For example, the over-voltage protection reference voltage OVPR may be determined as a voltage of an over-voltage protection level higher than and closest or second closest to that of the over-voltage protection voltage OVP when the output voltage Vout reaches a lower limit of the range of the rated voltage. To do this, the over-voltage protection reference voltage provider 100 may sequentially compare the over-voltage protection voltage OVP with voltages of the plurality of over-voltage protection levels OVPL1 to OVPLN until the output voltage Vout reaches the range of the rated voltage.

Figure 3:
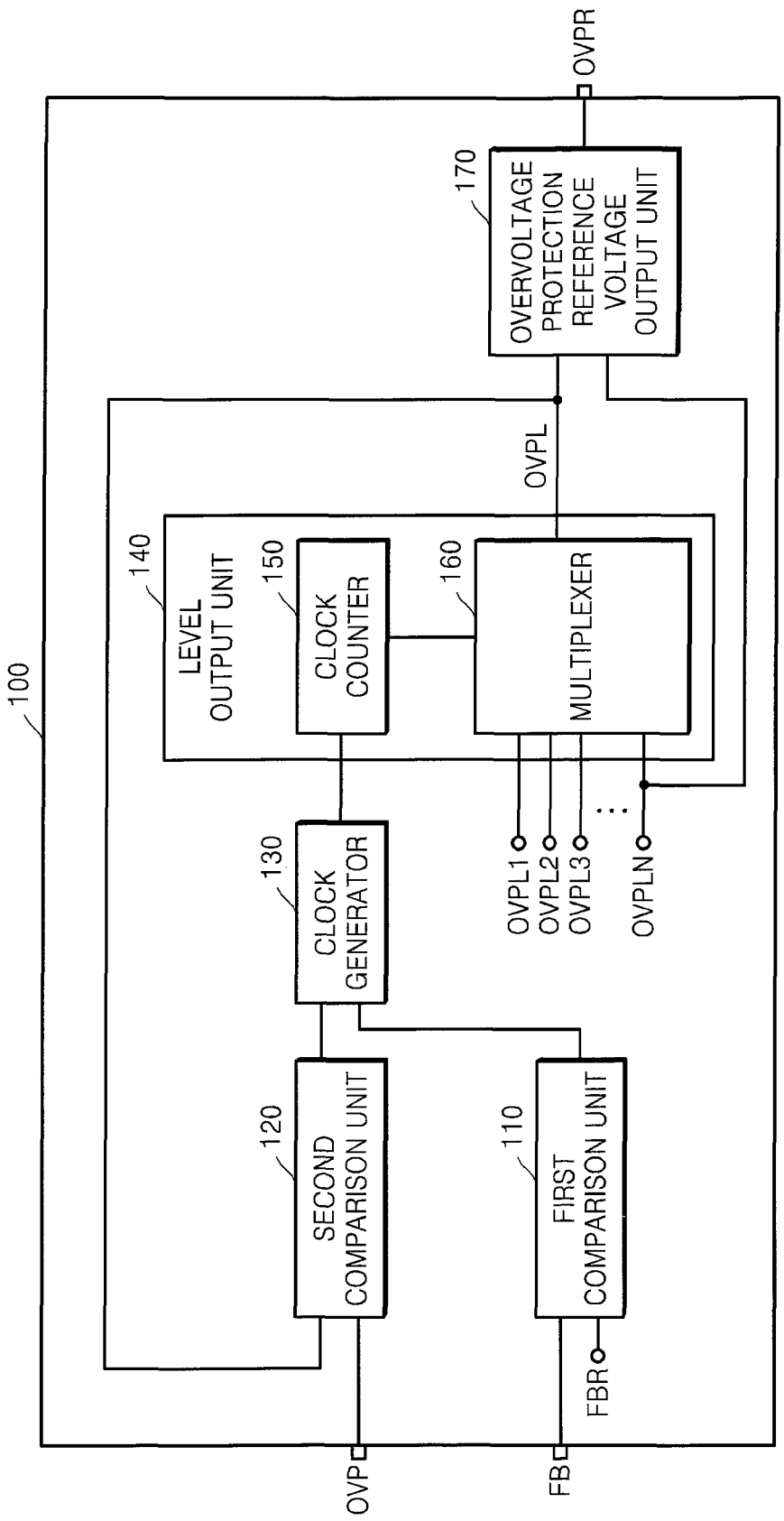
FIG. 3 is a detailed block diagram of an over-voltage protection reference voltage provider shown in FIG. 2.

The over-voltage protection reference voltage provider 100 may sense a time when the output voltage Vout reaches the range of the rated voltage by comparing the feedback voltage FB with a feedback reference voltage FBR (refer to FIG. 3). The feedback reference voltage FBR may be previously set in the adaptive over-voltage protection circuit 10. For example, the feedback reference voltage FBR may be an arbitrary voltage value between the voltage values of common power sources VDD and VSS.

As described above, the feedback voltage FB goes high when the output voltage Vout goes high. Thus, by setting the feedback reference voltage FBR so that the feedback voltage FB reaches the feedback reference voltage FBR when the output voltage Vout reaches the lower limit of the range of the rated voltage, the over-voltage protection reference voltage provider 100 may sense the time when the output voltage Vout reaches the range of the rated voltage. The feedback reference voltage FBR may correspond to a lower limit voltage of the load 50.

The over-voltage signal output unit 200 outputs the over-voltage signal OV by comparing the over-voltage protection voltage OVP with the over-voltage protection reference voltage OVPR provided by the over-voltage protection reference voltage provider 100. The over-voltage signal output unit 200 may include a comparator, which will be described in detail with reference to FIG. 6.

FIG. 3 is a detailed block diagram of the over-voltage protection reference voltage provider 100 shown in FIG. 2.

Referring to FIGS. 1 and 3, the over-voltage protection reference voltage provider 100 includes a first comparison unit 110, a second comparison unit 120, a clock generator 130, and a level output unit 140. The over-voltage protection reference voltage provider 100 may further include an over-voltage protection reference voltage output unit 170.

The first comparison unit 110 may receive the feedback voltage FB and the feedback reference voltage FBR and compare the feedback voltage FB with the feedback reference voltage FBR. An output signal of the first comparison unit 110 may be provided to the clock generator 130.

The first comparison unit 110 may include a comparator. The output signal of the first comparison unit 110 may be a digital signal, which is in a second logic state when the feedback voltage FB is lower than the feedback reference voltage FBR and in a first logic state when the feedback voltage FB is higher than the feedback reference voltage FBR.

In the specification, a signal may indicate a digital signal, the first logic state may correspond to a logic state 'HIGH (H)', and the second logic state may correspond to a logic state 'LOW (L)'. That is, a signal in the first logic state may have a voltage corresponding to the common power source VDD and a signal in the second logic state may have a voltage corresponding to the common power source VSS. However, it is noted that the first logic state and the second logic state may vary according to an implemented logic circuit. A signal that is a digital signal may be called a logic signal.

According to a context, a signal may mean a transition of a logic state. For example, 'a signal is generated' may mean that a logic state of the signal is transitioned from the second logic state (or the first logic state) to the first logic state (or the second logic state). According to a context, a signal may be an analog signal. For example, a voltage signal may not be a digital signal but an analog signal.

As described above, although the feedback voltage FB is provided outside the adaptive over-voltage protection circuit 10, the feedback reference voltage FBR is generated inside the feedback reference voltage FBR and may be previously set according to the magnitude or type of the load 50. For example, the feedback reference voltage FBR may be set to have an arbitrary voltage value distributed by two resistors connected in series between the common power sources VDD and VSS for driving the adaptive over-voltage protection circuit 10.

The second comparison unit 120 may receive the over-voltage protection voltage OVP and a voltage of an over-voltage protection level OVPL currently output from the level output unit 140 from among the plurality of over-voltage protection levels OVPL1 to OVPLN and compare the over-voltage protection voltage OVP with the voltage of the over-voltage protection level OVPL. An output signal of the second comparison unit 120 may be provided to the clock generator 130.

First to $N^{th}$ over-voltage protection levels OVPL1, OVPL2, OVPL3, OVPLN denote N different over-voltage protection levels, the first over-voltage protection level OVPL1 indicates the lowest over-voltage protection level, and an $N^{th}$ over-voltage protection level OVPLN indicates the highest over-voltage protection level. If necessary, a voltage of the $N^{th}$ over-voltage protection level OVPLN may be identical to the voltage of the common power source VDD. The inventive concept is not limited to the number of over-voltage protection levels OVPL1 to OVPLN.

The plurality of over-voltage protection levels OVPL1 to OVPLN may be generated by the power controller 12 or the adaptive over-voltage protection circuit 10. The plurality of over-voltage protection levels OVPL1 to OVPLN may be previously set by using the common power sources VDD and VSS for driving the power controller 12. A voltage distributor (not shown) including a plurality of resistors or diodes may be connected between the common power sources VDD and VSS, and voltages at nodes derived between the plurality of resistors or diodes may be used as the plurality of over-voltage protection levels OVPL1 to OVPLN.

The plurality of over-voltage protection levels OVPL1 to OVPLN may have voltage values evenly distributed between the common power sources VDD and VSS with the plurality of resistors or diodes having the same resistance or threshold voltage value.

OVPL denoting a currently output over-voltage protection level indicates an over-voltage protection level compared with the over-voltage protection voltage OVP by the second comparison unit 120. Hereinafter, OVPL may be denoted as 'a current over-voltage protection level'.

The output signal of the second comparison unit 120 may be a digital signal, which is in the first logic state when a voltage of the current over-voltage protection level OVPL is higher than the over-voltage protection voltage OVP and in the second logic state when the voltage of the current over-voltage protection level OVPL is lower than the over-voltage protection voltage OVP.

As described above, although the over-voltage protection voltage OVP may be provided outside the adaptive over-voltage protection circuit 10, the plurality of over-voltage protection levels OVPL1 to OVPLN are generated inside the adaptive over-voltage protection circuit 10 and may be previously set according to the magnitude or type of the load 50.

The clock generator 130 may output a clock signal in response to the output signal of the first comparison unit 110 and the output signal of the second comparison unit 120. The clock signal may be a digital signal and be provided to the level output unit 140.

The clock generator 130 may generate a rising or falling edge whenever the over-voltage protection voltage OVP is higher than the current over-voltage protection level OVPL. The rising edge indicates that the clock signal transitions from the second logic state to the first logic state, and the falling edge indicates that the clock signal transitions from the first logic state to the second logic state. The clock generator 130 may not generate the rising or falling edge any more if the feedback voltage FB is higher than the feedback reference voltage FBR.

According to another exemplary embodiment, the clock generator 130 may generate the rising or falling edge even when the feedback voltage FB is higher than the feedback reference voltage FBR for the first time.

The level output unit 140 may sequentially output the plurality of over-voltage protection levels OVPL1 to OVPLN one-by-one in response to the clock signal. As described above, an over-voltage protection level currently output from the level output unit 140 is called the current over-voltage protection level OVPL.

The level output unit 140 may output the first over-voltage protection level OVPL1 for the first time and output a second over-voltage protection level OVPL2 that is a next over-voltage protection level when a rising or falling edge of the clock signal is generated. In this way, the level output unit 140 may output a next over-voltage protection level of the current over-voltage protection level OVPL whenever a rising or falling edge of the clock signal is generated.

The level output unit 140 may include a clock counter 150 and a multiplexer 160.

The clock counter 150 may receive the clock signal and output a clock count signal by counting rising or falling edges of the clock signal. The clock count signal may be a digital signal having a plurality of bits corresponding to the number of rising or falling edges of the clock signal output from the clock generator 130. If the number of over-voltage protection levels OVPL1 to OVPLN is N, the number of bits of the clock count signal is greater than $\log_2 N$. It will be described below, but when the clock counter 150 includes a plurality of flip-flops, the number of bits of the clock count signal may be N−1.

The multiplexer 160 may receive the clock count signal output from the clock counter 150 as a control signal and the plurality of over-voltage protection levels OVPL1 to OVPLN generated by the adaptive over-voltage protection circuit 10 as an input signal and output a voltage of an over-voltage protection level (referred to as OVPL) corresponding to the clock count signal among the plurality of over-voltage protection levels OVPL1 to OVPLN. For example, if the clock count signal indicates 3, the multiplexer 160 may output a voltage of a third over-voltage protection level OVPL3 corresponding to 3.

As described above, a voltage of the current over-voltage protection level OVPL output from the multiplexer 160 may be provided to the second comparison unit 120 and the over-voltage protection reference voltage output unit 170.

The over-voltage protection reference voltage output unit 170 may output a voltage of a finally determined over-voltage protection level as the over-voltage protection reference voltage OVPR.

For example, the over-voltage protection reference voltage output unit 170 may output the voltage of the current over-voltage protection level OVPL output from the level output unit 140 as the over-voltage protection reference voltage OVPR when the feedback voltage FB is higher than the feedback reference voltage FBR while outputting the voltage of the highest over-voltage protection level OVPLN among the plurality of over-voltage protection levels OVPL1 to OVPLN as the over-voltage protection reference voltage OVPR. As another example, the over-voltage protection reference voltage output unit 170 may output the voltage of the common power source VDD as the over-voltage protection reference voltage OVPR before the feedback voltage FB is higher than the feedback reference voltage FBR.

Since the over-voltage protection reference voltage OVPR may be determined in the power controller 12 or the adaptive over-voltage protection circuit 10 by using the plurality of over-voltage protection levels OVPL1 to OVPLN instead of being input outside the power controller 12 or the adaptive over-voltage protection circuit 10, the power supply unit 20 having a simple circuit structure and having various forms and capacities regardless of a load state may be used.

Figure 4:
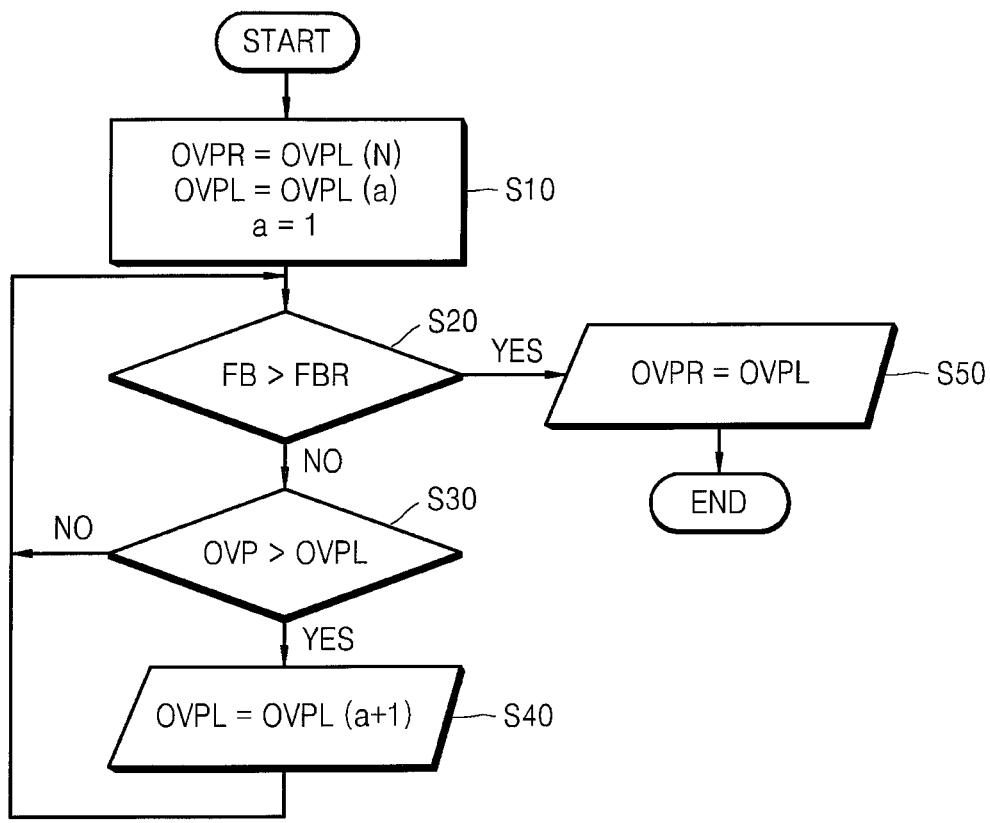
FIG. 4 is a flowchart of an operation of the over-voltage protection reference voltage provider shown in FIG. 2, according to an exemplary embodiment of the inventive concept.

FIG. 4 is a flowchart of an operation of the over-voltage protection reference voltage provider 100 shown in FIG. 2, according to an exemplary embodiment of the inventive concept.

Referring to FIGS. 3 and 4, in operation S10, the over-voltage protection reference voltage provider 100 is initialized. As a result, the level output unit 140 outputs the voltage of the lowest over-voltage protection level OVPL1 among the plurality of over-voltage protection levels OVPL1 to OVPLN. In addition, the over-voltage protection reference voltage output unit 170 outputs the voltage of the highest over-voltage protection level OVPLN among the plurality of over-voltage protection levels OVPL1 to OVPLN as the over-voltage protection reference voltage OVPR.

In FIG. 4, 'OVPL(N)' denotes the $N^{th}$ over-voltage protection level OVPLN and 'OVPL(a)' denotes an $a^{th}$ over-voltage protection level. That is, when a is 1 (a=1), 'OVPL(a)' denotes the first over-voltage protection level OVPL1.

In operation S20, the first comparison unit 110 compares the feedback voltage FB with the feedback reference voltage FBR. If the feedback voltage FB is higher than the feedback reference voltage FBR, the over-voltage protection reference voltage OVPR is determined as the voltage of the current over-voltage protection level OVPL in operation S50. Otherwise, if the feedback voltage FB is lower than the feedback reference voltage FBR, the second comparison unit 120 compares the over-voltage protection voltage OVP with the voltage of the current over-voltage protection level OVPL in operation S30.

If the over-voltage protection voltage OVP is higher than the voltage of the current over-voltage protection level OVPL, the level output unit 140 outputs an over-voltage protection level OVPL(a+1) next higher than the currently output over-voltage protection level OVPL (i.e., OVPL(a)) in operation S40. Here, 'OVPL(a+1)' may denote a next over-voltage protection level.

Then, the process goes back to operation S20 to compare the feedback voltage FB with the feedback reference voltage FBR in the first comparison unit 110.

However, if the over-voltage protection voltage OVP is lower than the voltage of the current over-voltage protection level OVPL in operation S30, the process goes back to operation S20 to compare the feedback voltage FB with the feedback reference voltage FBR in the first comparison unit 110.

The output voltage Vout starts from 0 and increases up to the range of the rated voltage. That is, the output voltage Vout increases until the feedback voltage FB is higher than the feedback reference voltage FBR, thereby increasing the over-voltage protection voltage OVP. Since the current over-voltage protection level OVPL is changed to the next over-voltage protection level OVPL(a+1) if the over-voltage protection voltage OVP is higher than the voltage of the current over-voltage protection level OVPL in operation S30, the over-voltage protection voltage OVP is lower than the voltage of the current over-voltage protection level OVPL for awhile. Thus, operations S30 and S20 are repeated until the feedback voltage FB is higher than the feedback reference voltage FBR or until the over-voltage protection voltage OVP is higher than the voltage of the current over-voltage protection level OVPL.

According to another exemplary embodiment, in operation S20, not only the feedback voltage FB and the feedback reference voltage FBR but also the over-voltage protection voltage OVP and the voltage of the current over-voltage protection level OVPL may be compared with each other. If the feedback voltage FB is higher than the feedback reference voltage FBR and if the over-voltage protection voltage OVP is lower than the voltage of the current over-voltage protection level OVPL, the process may proceed to operation S50. Otherwise, if the feedback voltage FB is lower than the feedback reference voltage FBR or if the over-voltage protection voltage OVP is higher than the voltage of the current over-voltage protection level OVPL, the process may proceed to operation S30.

In addition, in operation S30 not only the over-voltage protection voltage OVP and the voltage of the current over-voltage protection level OVPL but also the feedback voltage FB and the feedback reference voltage FBR may be compared with each other. If the over-voltage protection voltage OVP is higher than the voltage of the current over-voltage protection level OVPL or if the feedback voltage FB is higher than the feedback reference voltage FBR, the process may proceed to operation S40. Otherwise, if the over-voltage protection voltage OVP is lower than the voltage of the current over-voltage protection level OVPL and if the feedback voltage FB is lower than the feedback reference voltage FBR, the process may proceed to operation S20.

Figure 5:
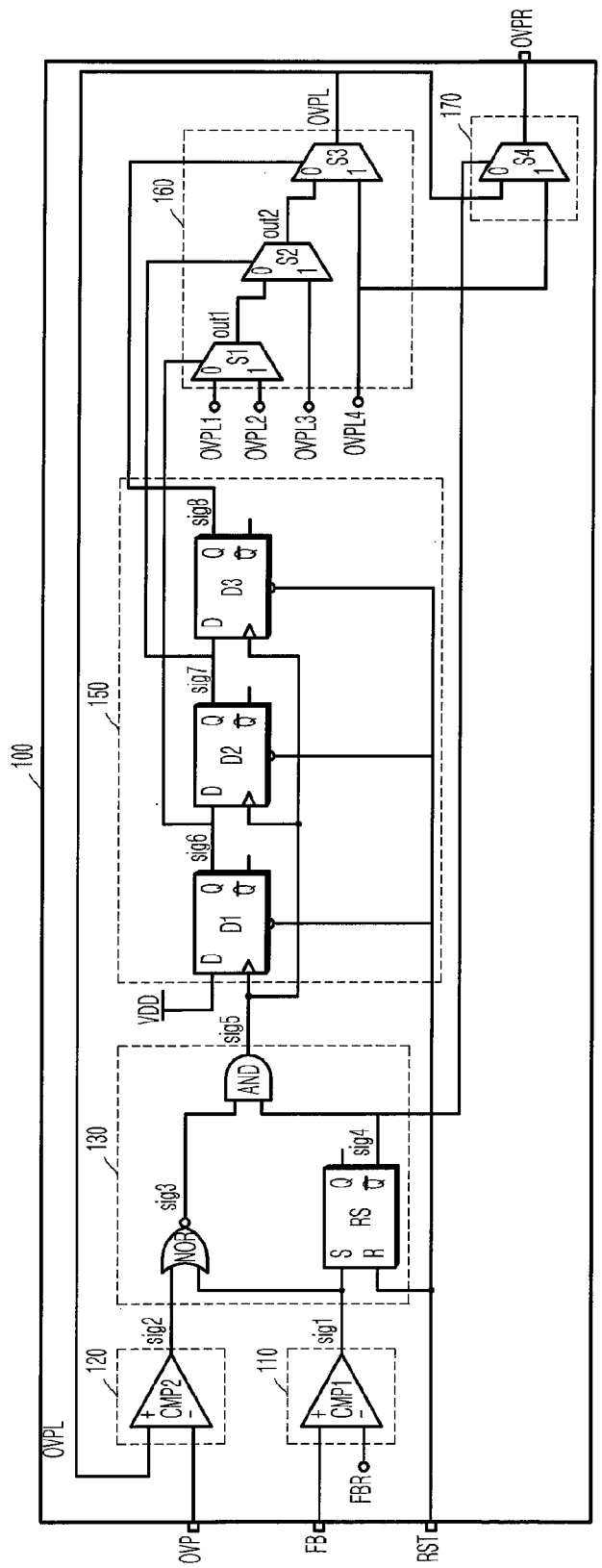
FIG. 5 is a circuit diagram of the over-voltage protection reference voltage provider for performing the operation of the flowchart shown in FIG. 4.

FIG. 5 is a circuit diagram of the over-voltage protection reference voltage provider 100 for performing the operation of the flowchart shown in FIG. 4.

Referring to FIG. 5, the over-voltage protection reference voltage provider 100 includes the first comparison unit 110, the second comparison unit 120, the clock generator 130, the level output unit 140, and the over-voltage protection reference voltage output unit 170. The over-voltage protection reference voltage provider 100 receives the over-voltage protection voltage OVP, the feedback voltage FB, and a reset signal RST and outputs the over-voltage protection reference voltage OVPR. In addition, the over-voltage protection reference voltage provider 100 may use the feedback reference voltage FBR and a plurality of over-voltage protection levels OVPL1 to OVPL4, which may be internally pre-determined.

Although the number of over-voltage protection levels OVPL1 to OVPL4 is 4 in FIG. 5, this is an only example, and the inventive concept is not limited thereto. In addition, the circuit diagram shown in FIG. 5 is a circuit diagram according to an exemplary embodiment, is only an example, and may be changed by those of ordinary skill in the art. Thus, it is noted that the inventive concept is not limited to the diagram shown in FIG. 5.

The first comparison unit 110 may include a first comparator CMP1. The feedback voltage FB may be input to a non-reverse input terminal (+) of the first comparator CMP1, and the feedback reference voltage FBR may be input to a reverse input terminal (−) thereof. The first comparator CMP1 may output a first logic signal sig1 through an out terminal thereof.

The second comparison unit 120 may include a second comparator CMP2. The current over-voltage protection level OVPL may be input to a non-reverse input terminal (+) of the second comparator CMP2, and the over-voltage protection voltage OVP may be input to a reverse input terminal (−) thereof. The second comparator CMP2 may output a second logic signal sig2 through an out terminal thereof.

The clock generator 130 may include a NOR gate NOR, an RS latch RS, and an AND gate AND.

The NOR gate NOR receives the first logic signal sig1 and the second logic signal sig2 and outputs a NOR operation result of the first logic signal sig1 and the second logic signal sig2 as a third logic signal sig3.

The RS latch RS includes a set input terminal S for receiving the first logic signal sig1 and a reset input terminal R for receiving the reset signal RST. A logic signal output from an output terminal Q of the RS latch RS is determined according to logic signals input through the set input terminal S and the reset input terminal R. If a logic signal in the first logic state ('H') is input to the set input terminal S and if a logic signal in the second logic state ('L') is input to the reset input terminal R, the RS latch RS outputs a logic signal in the first logic state ('H') through the output terminal Q. On the contrary, if a logic signal in the second logic state ('L') is input to the set input terminal S and if a logic signal in the first logic state ('H') is input to the reset input terminal R, the RS latch RS outputs a logic signal in the second logic state ('L') through the output terminal Q. In addition, if a logic signal in the second logic state ('L') is input to both the set input terminal S and the reset input terminal R, the RS latch RS maintains a logic state output through the output terminal Q. On the contrary, if a logic signal in the first logic state ('H') is input to both the set input terminal S and the reset input terminal R, an output of the RS latch RS is not defined. A logic signal output from a reverse output terminal /Q is a reverse signal of a logic signal output from the output terminal Q. The RS latch RS outputs a fourth logic signal sig4 through the reverse output terminal /Q.

The reset signal RST is a signal for initializing the over-voltage protection reference voltage provider 100. The initialization operation (operation S10) shown in FIG. 4 may be performed by the reset signal RST. If the reset signal RST is input, the RS latch RS may output the fourth logic signal sig4 in the first logic state through the reverse output terminal /Q.

The AND gate AND receives the third logic signal sig3 and the fourth logic signal sig4 and outputs an AND operation result of the third logic signal sig3 and the fourth logic signal sig4 as a fifth logic signal sig5. The fifth logic signal sig5 may be the clock signal.

The clock counter 150 may include 3 flip-flops, namely, first, second, and third flip-flops D1, D2, and D3. The first, second, and third flip-flops D1, D2, and D3 may be D flip-flops. The inventive concept is not limited to the number of flip-flops D1, D2, and D3, and the number thereof is determined according to the number of over-voltage protection levels OVPL1 to OVPL4.

An input terminal D of the first flip-flop D1 may be connected to the common power VDD. That is, a signal in the first logic state may be input to the input terminal D of the first flip-flop D1. The first flip-flop D1 may output a sixth logic signal sig6 through an output terminal Q thereof, and the sixth logic signal sig6 may be input to an input terminal D of the second flip-flop D2. The second flip-flop D2 may output a seventh logic signal sig7 through an output terminal Q thereof, and the seventh logic signal sig7 may be input to an input terminal D of the third flip-flop D3. The third flip-flop D3 may output an eighth logic signal sig8 through an output terminal Q thereof. The fifth logic signal sig5 may be input to clock input terminals of the first, second, and third flip-flops D1, D2, and D3.

The sixth, seventh, and eighth logic signals sig6, sig7, and sig8 may correspond to the clock count signal, and in this case, the clock count signal may be a logic signal having 3 bits.

Each of the first, second, and third flip-flops D1, D2, and D3 may output a signal having the same logic state as a signal input to the input terminal D thereof through the output terminal Q thereof Thus, for the sixth, seventh, and eighth logic signals sig6, sig7, and sig8 initialized to the second logic state, when a first rising edge of the clock signal is generated for the first time, the sixth logic signal sig6 transitions to the first logic state, and when a second rising edge is generated, the seventh logic signal sig7 also transitions to the first logic state, and when a third rising edge is generated, the eighth logic signal sig8 also transitions to the first logic state.

Although the clock counter 150 is implemented using the 3 flip-flops, namely, the first, second, and third flip-flops D1, D2, and D3 in FIG. 5, the clock counter 150 may be implemented using other circuit configurations. Thus, the inventive concept is not limited to the form shown in FIG. 5. For example, when it is designed that a NAND gate is used instead of the AND gate AND and the first, second, and third flip-flops D1, D2, and D3 operate in a falling edge of the clock signal, the same operation as described above may be performed.

The multiplexer 160 may include 3 selectors, namely, first, second, and third selectors S1, S2, and S3. The first, second, and third selectors S1, S2, and S3 may be 2:1 selectors. The number of selectors S1, S2, and S3 is determined according to the number of over-voltage protection levels OVPL1 to OVPL4 and the inventive concept is not limited to the number of selectors S1, S2, and S3 shown in FIG. 5.

Each of the first, second, and third selectors S1, S2, and S3 includes a first input terminal 1, a second input terminal 0, a control input terminal, and an output terminal. If a control signal in the first logic state ('H') is input to the control input terminal, a signal input to the first input terminal 1 is output through the output terminal, and if a control signal in the second logic state ('L') is input to the control input terminal, a signal input to the second input terminal 0 is output through the output terminal. The signals input to the first input terminal 1 and the second input terminal 0 and the signals output through the output terminal may be analog signals having a constant voltage.

A voltage signal of the first over-voltage protection level OVPL1 is input to the second input terminal 0 of the first selector S1, and a voltage signal of the second over-voltage protection level OVPL2 is input to the first input terminal 1 thereof. The sixth logic signal sig6 provided by the first flip-flop D1 is input to the control input terminal of the first selector S1, and a first voltage signal out1 is output in response to the sixth logic signal sig6.

The first voltage signal out1 is input to the second input terminal 0 of the second selector S2, and a voltage signal of the third over-voltage protection level OVPL3 is input to the first input terminal 1 thereof. The seventh logic signal sig7 provided by the second flip-flop D2 is input to the control input terminal of the second selector S2, and a second voltage signal out2 is output in response to the seventh logic signal sig7.

The second voltage signal out2 is input to the second input terminal 0 of the third selector S3, and a voltage signal of the fourth over-voltage protection level OVPL4 is input to the first input terminal 1 thereof. The eighth logic signal sig8 provided by the third flip-flop D3 is input to the control input terminal of the third selector S3, and a voltage signal OVPL is output in response to the eighth logic signal sig8. As described above, the voltage signal OVPL corresponds to the current over-voltage protection level OVPL. The current over-voltage protection level OVPL is input to the non-reverse input terminal (+) of the second comparator CMP2 of the second comparison unit 120.

Although the multiplexer 160 is implemented using the 3 selectors, namely, first, second, and third selectors S1, S2, and S3 in FIG. 5, the multiplexer 160 may be implemented using other circuit configurations. For example, the multiplexer 160 may be implemented using 4:1 selectors. Thus, the inventive concept is not limited to the form shown in FIG. 5.

The over-voltage protection reference voltage output unit 170 may include a fourth selector S4. The fourth selector S4 may be a 2:1 selector and may perform substantially the same function as the first, second, and third selectors S1, S2, and S3.

A voltage signal of the current over-voltage protection level OVPL is input to a second input terminal 0 of the fourth selector S4 and the voltage signal of the fourth over-voltage protection level OVPL4 is input to the first input terminal 1 thereof. The fourth logic signal sig4 provided by the reverse output terminal /Q of the RS latch RS is input to a control input terminal of the fourth selector S4 and a voltage signal OVPR is output in response to the fourth logic signal sig4. The voltage signal OVPR corresponds to the over-voltage protection reference voltage OVPR and is provided to the over-voltage signal output unit 200.

Figure 6:
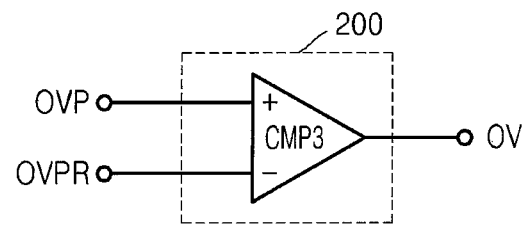
FIG. 6 is a circuit diagram of an over-voltage signal output unit shown in FIG. 2.

FIG. 6 is a circuit diagram of the over-voltage signal output unit 200 shown in FIG. 2.

Referring to FIGS. 2 and 6, the over-voltage signal output unit 200 may include a third comparator CMP3. The over-voltage protection voltage OVP may be input to a non-reverse input terminal (+) of the third comparator CMP3 and the over-voltage protection reference voltage OVPR provided by the over-voltage protection reference voltage provider 100 may be input to a reverse input terminal (−) thereof. The third comparator CMP3 may output the over-voltage signal OV through an output terminal.

The over-voltage signal OV may have the first logic state when the over-voltage protection voltage OVP is higher than the over-voltage protection reference voltage OVPR and have the second logic state when the over-voltage protection voltage OVP is lower than the over-voltage protection reference voltage OVPR. Thus, when the over-voltage signal OV has the first logic state, it may be sensed that the over-voltage protection voltage OVP is higher than the over-voltage protection reference voltage OVPR. As a result of the sensing, for example, an operation of triggering an alarm or stopping the supply of the output voltage Vout may be performed according to a circuit configuration.

Figure 7:
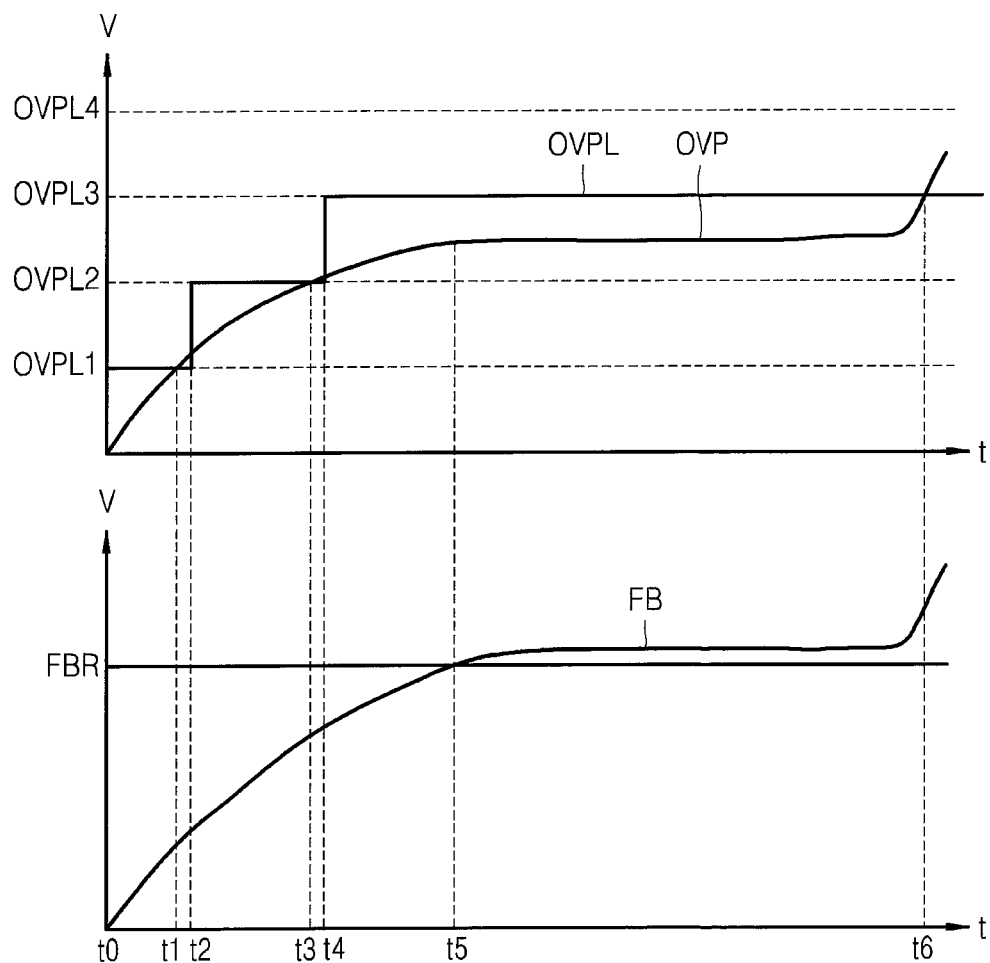
FIG. 7 shows graphs for describing an operation of the adaptive over-voltage protection circuit according to the flowchart shown in FIG. 4.

FIG. 7 shows graphs for describing an operation of the adaptive over-voltage protection circuit 10 according to the flowchart shown in FIG. 4, wherein the upper graph shows the over-voltage protection voltage OVP with respect to a time axis and the lower graph shows the feedback voltage FB with respect to a time axis.

Referring to the FIGS. 1, 3, and 7, when the power supply unit 20 starts supplying power to the load 50 at a time t0, the output voltage Vout starts increasing from 0 V. At this time, the current over-voltage protection level OVPL is set to the first over-voltage protection level OVPL1. In addition, the over-voltage protection voltage OVP and the feedback voltage FB start increasing from 0 V in response to the output voltage Vout.

When the over-voltage protection voltage OVP is higher than the first over-voltage protection level OVPL1 at a time t1, the current over-voltage protection level OVPL increases to the second over-voltage protection level OVPL2 at a time t2. Although there is a considerable time interval between t2 and t1 in FIG. 7 to help an easy understanding of the inventive concept, an actual time interval between t2 and t1 is very short.

When the over-voltage protection voltage OVP is higher than the second over-voltage protection level OVPL2 at a time t3, the current over-voltage protection level OVPL increases to the third over-voltage protection level OVPL3 at a time t4. An actual time interval between t3 and t4 is also very short.

When the feedback voltage FB is higher than the feedback reference voltage FBR at a time t5, the current over-voltage protection level OVPL that is the third over-voltage protection level OVPL3 is determined as the over-voltage protection reference voltage OVPR, and when the over-voltage protection voltage OVP is higher than the over-voltage protection reference voltage OVPR at a time t6, the over-voltage signal OV is generated.

FIG. 7 shows that a waveform of the over-voltage protection voltage OVP is similar to that of the feedback voltage FB. However, the waveform of the over-voltage protection voltage OVP may be quite different from that of the feedback voltage FB according to the magnitude or type of the load 50. For example, if the load 50 is a diode load, when the over-voltage protection voltage OVP increases in proportion to the output voltage Vout, the feedback voltage FB may increase in a form of stairs after a predetermined time. The waveforms of the over-voltage protection voltage OVP and the feedback voltage FB are examples and do not limit the inventive concept.

FIG. 8 is a table showing transitions of signals of the circuit diagrams of FIGS. 5 and 6 according to the graphs of FIG. 7.

Referring to FIGS. 5 to 7 and 8, at the time t0, the over-voltage protection voltage OVP and the feedback voltage FB are 0 V, and the RS latch RS and the first, second, and third flip-flops D1, D2, and D3 are initialized. The fourth logic signal sig4 provided from the reverse output terminal /Q of the RS latch RS is in the first logic state ('H'), and the sixth, seventh, and eighth logic signals sig6, sig7, and sig8 output from the output terminals Q of the first, second, and third flip-flops D1, D2, and D3 are in the second logic state ('L'). As a result, the first voltage signal out1 and the second voltage signal out2 are the first over-voltage protection level OVPL1, and the current over-voltage protection level OVPL is set to the first over-voltage protection level OVPL1.

Since the over-voltage protection voltage OVP is lower than the first over-voltage protection level OVPL1 before the time t1, the second logic signal s2 is in the first logic state ('H'). In addition, since the feedback voltage FB is lower than the feedback reference voltage FBR, the first logic signal s1 is in the second logic state ('L').

Since the third logic signal sig3 is a NOR operation result of the first logic signal s1 and the second logic signal s2, the third logic signal sig3 is in the second logic state ('L'). Since the fifth logic signal sig5 is an AND operation result of the third logic signal sig3 and the fourth logic signal sig4, the fifth logic signal sig5 is in the second logic state ('L').

Since the fourth logic signal sig4 is in the first logic state ('H'), the fourth selector S4 outputs a voltage of the fourth over-voltage protection level OVPL4 as the over-voltage protection reference voltage OVPR. Since the over-voltage protection voltage OVP is lower than the fourth over-voltage protection level OVPL4 that is the over-voltage protection reference voltage OVPR, the fourth comparator CMP4 outputs the over-voltage signal OV in the second logic state ('L').

Since the over-voltage protection voltage OVP is higher than the current over-voltage protection level OVPL set to the first over-voltage protection level OVPL1 between the time t1 and the time t2, the second logic signal s2 is in the second logic state ('L'). However, since the feedback voltage FB is still lower than the feedback reference voltage FBR, the first logic signal s1 is still in the second logic state ('L') and the fourth logic signal sig4 is still in the first logic state ('H').

According to the logic state transition of the second logic signal s2, the third logic signal sig3 is in the first logic state ('H'), and the fifth logic signal sig5 is also in the first logic state ('H'). When the fifth logic signal sig5 that is the clock signal transitions from the second logic state ('L') to the first logic state ('H'), a rising edge of the clock signal is generated. As a result, the sixth logic signal sig6 that is an output signal of the first flip-flop D1 operating in response to the rising edge of the fifth logic signal sig5 transitions from the second logic state ('L') to the first logic state ('H'). However, since the second flip-flop D2 receives the sixth logic signal sig6 in the second logic state ('L') as an input signal, the seventh logic signal sig7 is still in the second logic state ('L'). The eighth logic signal sig8 is also still in the second logic state ('L'). As a result, the first voltage signal out1 of the first selector S1, the second voltage signal out2 of the second selector S2, and the current over-voltage protection level OVPL of the third selector S3 are the second over-voltage protection level OVPL2 at the time t2. However, since the over-voltage protection reference voltage OVPR is still the fourth over-voltage protection level OVPL4, the over-voltage signal OV is also still in the second logic state ('L').

Since the over-voltage protection voltage OVP is lower than the current over-voltage protection level OVPL set to the second over-voltage protection level OVPL2 between the time t2 and the time t3, the second logic signal s2 is in the first logic state ('H'). Accordingly, the third logic signal sig3 and the fifth logic signal sig5 are in the second logic state ('L'). However, since the first, second, and third flip-flops D1, D2, and D3 do not react to a falling edge of the fifth logic signal sig5, the first voltage signal out1, the second voltage signal out2, and the current over-voltage protection level OVPL maintain their previous states.

Between the time t3 and the time t4, the over-voltage protection voltage OVP is higher than the current over-voltage protection level OVPL set to the second over-voltage protection level OVPL2. Accordingly, the second logic signal s2 is in the second logic state ('L'), and the third logic signal sig3 and the fifth logic signal sig5 are in the first logic state ('H'), thereby generating a rising edge of the clock signal. As a result, at the time t4, the seventh logic signal sig7 is in the first logic state ('H'), and the second voltage signal out2 and the current over-voltage protection level OVPL are the third over-voltage protection level OVPL3. However, since the over-voltage protection reference voltage OVPR is still the fourth over-voltage protection level OVPL4, the over-voltage signal OV is also still in the second logic state ('L').

Since the over-voltage protection voltage OVP is lower than the current over-voltage protection level OVPL set to the third over-voltage protection level OVPL3 between the time t4 and the time t5, the second logic signal s2 is in the first logic state ('H'). Accordingly, the third logic signal sig3 and the fifth logic signal sig5 are in the second logic state ('L'). However, since the first, second, and third flip-flops D1, D2, and D3 do not react a falling edge of the fifth logic signal sig5, the first voltage signal out1, the second voltage signal out2, and the current over-voltage protection level OVPL maintain their previous states.

At the time t5, the feedback voltage FB starts higher than the feedback reference voltage FBR, and the first logic signal s1 is in the first logic state ('H'). However, the third logic signal sig3 is still in the second logic state ('L') as a NOR operation result of the first logic signal sig1 and the second logic signal s2.

The fourth logic signal sig4 output from the reverse output terminal /Q of the RS latch RS is in the second logic state ('L'). Since the output of the RS latch RS is not changed when both the set input terminal S and the reset input terminal R are in the second logic state ('L'), even though the feedback voltage FB is lower than the feedback reference voltage FBR, the fourth logic signal sig4 maintains the second logic state ('L').

The fifth logic signal sig5 maintains the second logic state ('L') as an AND operation result of the third logic signal sig3 and the fourth logic signal sig4. Furthermore, since the fourth logic signal sig4 maintains the second logic state ('L') by the RS latch RS, the fifth logic signal sig5 always maintains the second logic state ('L') regardless of a logic state of the third logic signal sig3. Accordingly, the fifth logic signal sig5 does not generate a rising edge any more.

When the fourth logic signal sig4 is in the second logic state ('L'), the fourth selector S4 outputs the current over-voltage protection level OVPL, i.e., the third over-voltage protection level OVPL3, as the over-voltage protection reference voltage OVPR. Since the fourth logic signal sig4 maintains the second logic state ('L'), the over-voltage protection reference voltage OVPR is also determined as the third over-voltage protection level OVPL3.

At the time t6, the over-voltage protection voltage OVP starts higher than the over-voltage protection reference voltage OVPR determined as the third over-voltage protection level OVPL3. Accordingly, the over-voltage signal OV is in the first logic state ('H'), and an over-voltage state may be sensed by receiving the over-voltage signal OV.

As described above, even though the second logic signal sig2 transitions to the second logic state ('L'), the transition of the second logic signal sig2 does not affect the clock signal, i.e., the fifth logic signal sig5.

Figure 9:
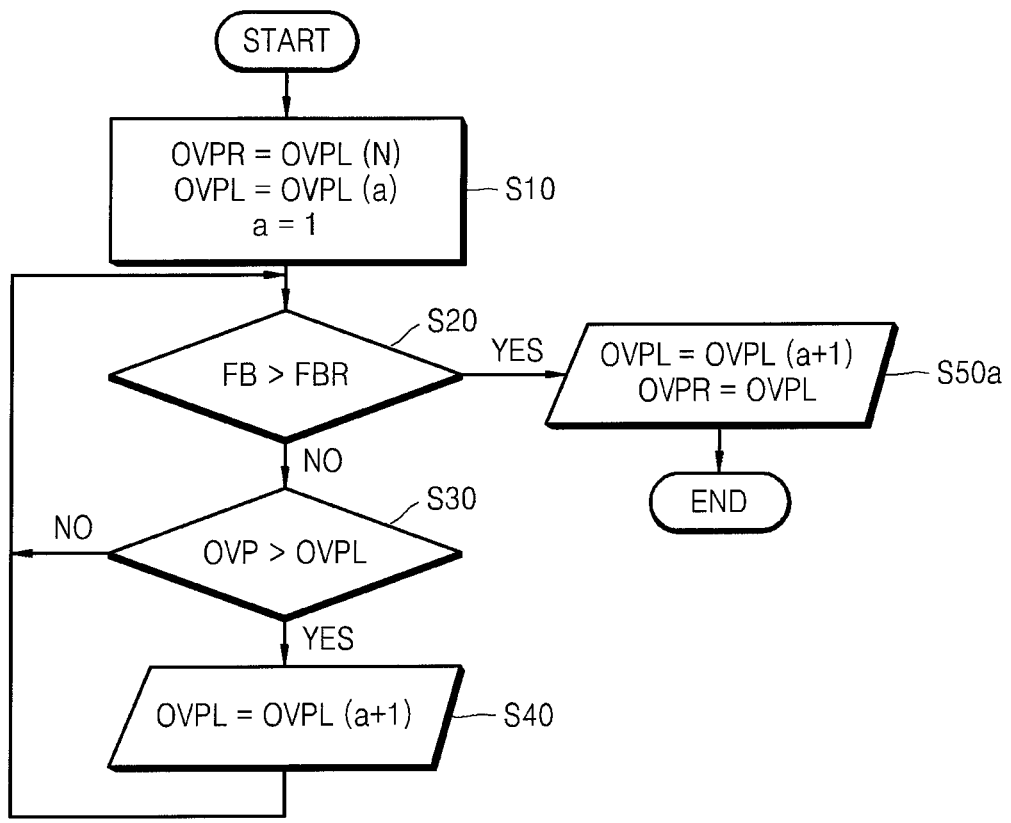
FIG. 9 is a flowchart of an operation of the over-voltage protection reference voltage provider shown in FIG. 2, according to another exemplary embodiment of the inventive concept.

FIG. 9 is a flowchart of an operation of the over-voltage protection reference voltage provider 100 shown in FIG. 2, according to another exemplary embodiment of the inventive concept. Comparing the flowchart of FIG. 9 with the flowchart of FIG. 4, operations S10 to S40 are the same. Thus, operations S10 to S40 are not described again.

Referring to FIGS. 3 and 9, the first comparison unit 110 compares the feedback voltage FB with the feedback reference voltage FBR in operation S20, and if the feedback voltage FB is higher than the feedback reference voltage FBR, the operation proceeds to operation S50a.

In operation S50a, the level output unit 140 outputs the over-voltage protection level OVPL(a+1) next higher than the currently output over-voltage protection level OVPL (i.e., OVPL(a)), and the over-voltage protection reference voltage OVPR is set to a voltage of the next over-voltage protection level OVPL(a+1).

If the output voltage Vout does not reach a normal state still when the feedback voltage FB exceeds the feedback reference voltage FBR, the over-voltage protection voltage OVP exceeds the over-voltage protection reference voltage OVPR determined as the current over-voltage protection level OVPL (i.e., OVPL(a)), and accordingly, the over-voltage signal OV may be generated. However, by determining the over-voltage protection reference voltage OVPR as the next over-voltage protection level OVPL(a+1), a margin for the output voltage Vout to be normally fluctuated may be provided.

Figure 10:
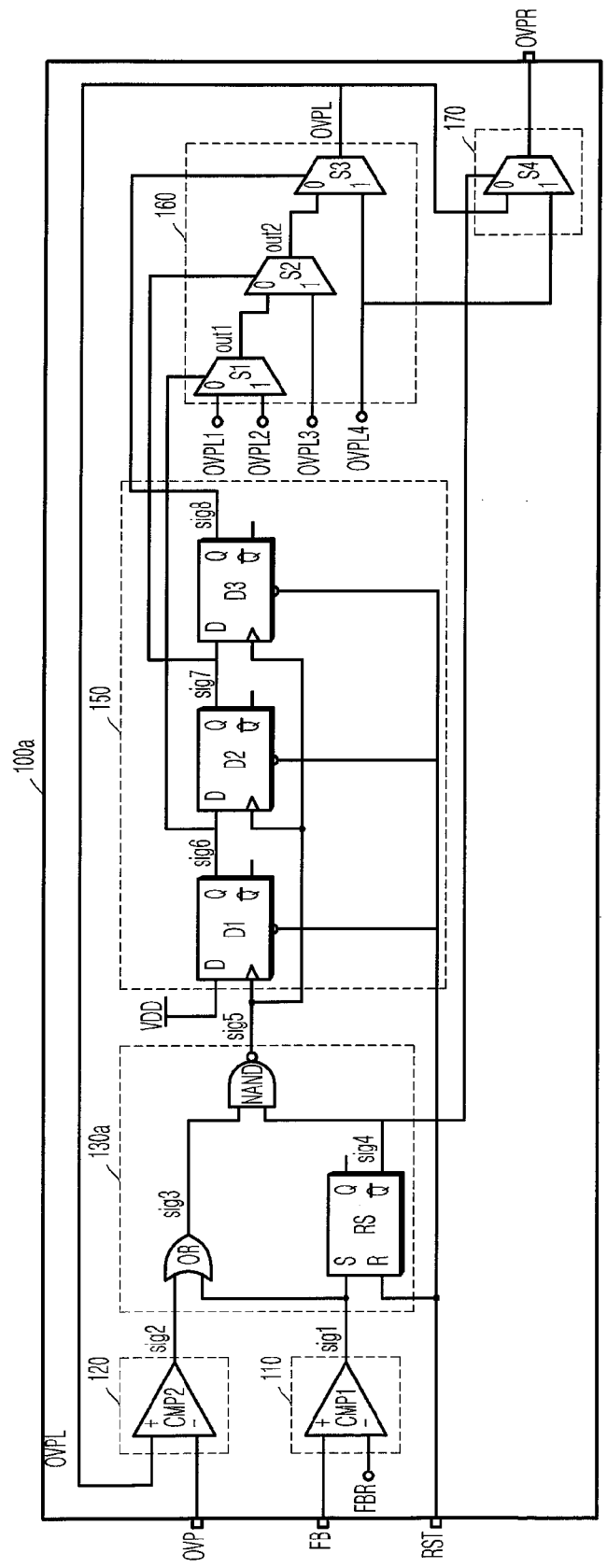
FIG. 10 is a circuit diagram of the over-voltage protection reference voltage provider for performing the operation of the flowchart shown in FIG. 9.

FIG. 10 is a circuit diagram of an over-voltage protection reference voltage provider 100a for performing the operation of the flowchart shown in FIG. 9. Comparing the circuit diagram of FIG. 10 with the circuit diagram of FIG. 5, the first comparison unit 110, the second comparison unit 120, the clock counter 150, the multiplexer 160, and the over-voltage protection reference voltage output unit 170 are the same. Thus, they are not described again.

Referring to FIG. 10, a clock generator 130a may include an OR gate OR, an RS latch RS, and a NAND gate NAND.

The OR gate OR receives the first logic signal sig1 and the second logic signal sig2 and outputs an OR operation result of the first logic signal sig1 and the second logic signal sig2 as the third logic signal sig3.

The RS latch RS includes a set input terminal S for receiving the first logic signal sig1 and a reset input terminal R for receiving the reset signal RST. The RS latch RS outputs the fourth logic signal sig4 through a reverse output terminal /Q. If the reset signal RST is input to the reset input terminal R, the RS latch RS outputs the fourth logic signal sig4 in the first logic state through the reverse output terminal /Q.

The NAND gate NAND receives the third logic signal sig3 and the fourth logic signal sig4 and outputs a NAND operation result of the third logic signal sig3 and the fourth logic signal sig4 as the fifth logic signal sig5. The fifth logic signal sig5 may be the clock signal.

The circuit diagram shown in FIG. 10 is only an example, and it may be modified by those of ordinary skill in the art, and thus, the inventive concept is not limited to the circuit diagram shown in FIG. 10.

Figure 11:
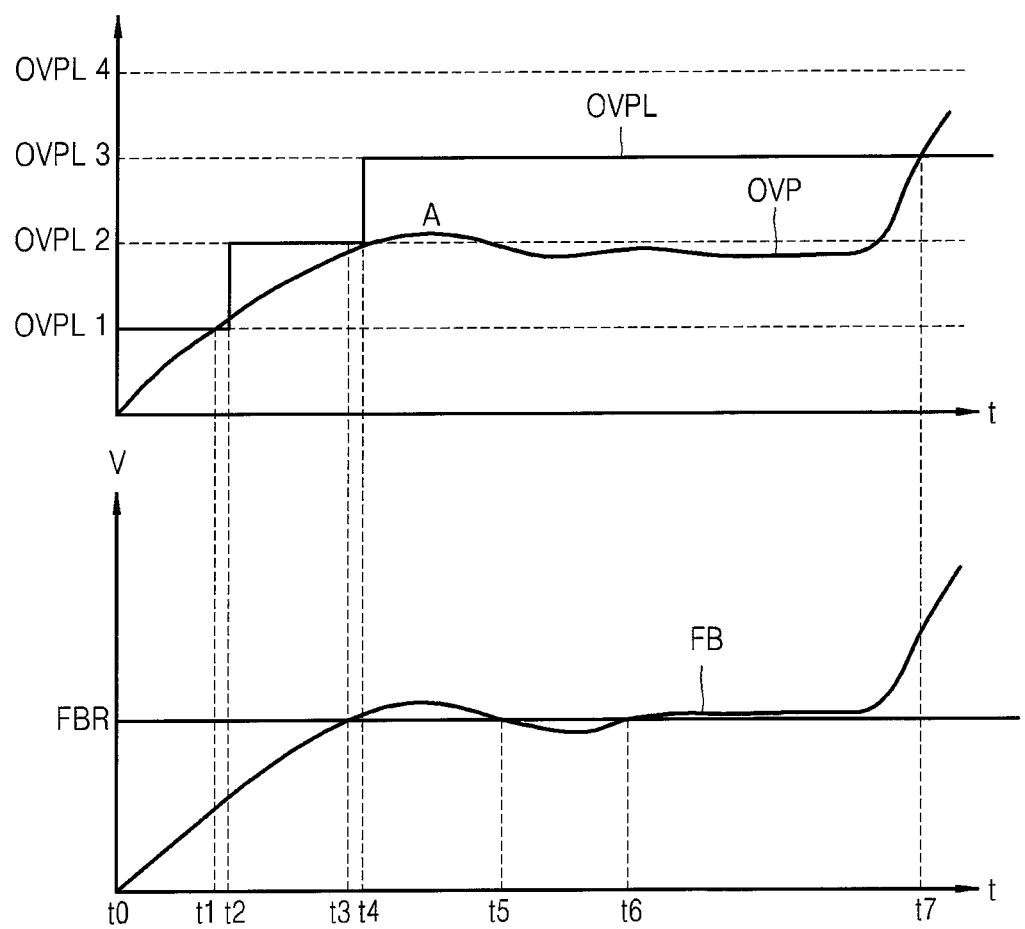
FIG. 11 shows graphs for describing an operation of the adaptive over-voltage protection circuit according to the flowchart shown in FIG. 9.

FIG. 11 shows graphs for describing an operation of the adaptive over-voltage protection circuit 10 according to the flowchart shown in FIG. 9, wherein the upper graph shows the over-voltage protection voltage OVP in the time axis and the lower graph shows the feedback voltage FB in the time axis.

At a time t0, the current over-voltage protection level OVPL is set to the first over-voltage protection level OVPL1, and the over-voltage protection voltage OVP and the feedback voltage FB start increasing from 0 V in response to the output voltage Vout.

At a time t1, the over-voltage protection voltage OVP starts higher than the first over-voltage protection level OVPL1, and therefore, the current over-voltage protection level OVPL increases to the second over-voltage protection level OVPL2 at a time t2.

At a time t3, the feedback voltage FB starts higher than the feedback reference voltage FBR, and thus, the over-voltage protection reference voltage OVPR is determined as the second over-voltage protection level OVPL2 that is the current over-voltage protection level OVPL according to the flowchart of FIG. 4. However, if the over-voltage protection voltage OVP is higher than the second over-voltage protection level OVPL2 due to an additional increase or a voltage ripple of the output voltage Vout for reaching a normal state as indicated by 'A' in FIG. 11, the over-voltage signal OV is generated. However, since this is a normal operation for the output voltage Vout to reach the normal state, the over-voltage signal OV should not be generated.

To prevent this problem, according to the flowchart of FIG. 9, at a time t4, the current over-voltage protection level OVPL increases to the third over-voltage protection level OVPL3, and the over-voltage protection reference voltage OVPR is determined as the third over-voltage protection level OVPL3 that is the current over-voltage protection level OVPL. Accordingly, even though the over-voltage protection voltage OVP is higher than the second over-voltage protection level OVPL2, the over-voltage signal OV is not generated.

In addition, even though the feedback voltage FB starts lower or higher than the feedback reference voltage FBR at a time t5 or t6, the over-voltage protection reference voltage OVPR is not changed. In addition, if over-voltage protection voltage OVP starts higher than the over-voltage protection reference voltage OVPR at a time t7, the over-voltage signal OV is generated.

FIG. 12 is a table showing transitions of signals of the circuit diagrams of FIGS. 10 and 6 according to the graphs of FIG. 11.

Referring to FIGS. 6, 10, 11, and 12, at the time t0, the RS latch RS and the first, second, and third flip-flops D1, D2, and D3 are initialized, and thus, the fourth logic signal sig4 is in the first logic state ('H'), and the output terminals Q of the first, second, and third flip-flops D1, D2, and D3 are in the second logic state ('L'). As a result, the first voltage signal out1, the second voltage signal out2, and the current over-voltage protection level OVPL are the first over-voltage protection level OVPL1. At this time, the over-voltage protection voltage OVP and the feedback voltage FB may be 0 V.

Since the over-voltage protection voltage OVP and the feedback voltage FB are lower than the first over-voltage protection level OVPL1 and the feedback reference voltage FBR before the time t1, respectively, the second logic signal s2 is in the first logic state ('H'), and the first logic signal s1 is in the second logic state ('L'). In addition, the fourth logic signal sig4 maintains the first logic state ('H').

Since the third logic signal sig3 is an OR operation result of the first logic signal s1 and the second logic signal s2, the third logic signal sig3 is in the first logic state (IF). Since the fifth logic signal sig5 is a NAND operation result of the third logic signal sig3 and the fourth logic signal sig4, the fifth logic signal sig5 is in the second logic state ('L').

The fourth selector S4 outputs a voltage of the fourth over-voltage protection level OVPL4 as the over-voltage protection reference voltage OVPR according to the fourth logic signal sig4. In addition, the fourth comparator CMP4 outputs the over-voltage signal OV in the second logic state ('L').

Since the over-voltage protection voltage OVP is higher than the current over-voltage protection level OVPL set to the first over-voltage protection level OVPL1 between the time t1 and the time t2, the second logic signal s2 is in the second logic state ('L'). However, the first logic signal s1 is still in the second logic state ('L'), and the fourth logic signal sig4 is still in the first logic state ('H').

According to the logic state transition of the second logic signal s2, the third logic signal sig3 is in the second logic state ('L'), and the fifth logic signal sig5 is in the first logic state ('H'). When the fifth logic signal sig5 transitions from the second logic state ('L') to the first logic state ('H'), a rising edge of the clock signal is generated. As a result, the sixth logic signal sig6 that is an output signal of the first flip-flop D1 transitions from the second logic state ('L') to the first logic state ('H'). However, since the second flip-flop D2 receives the sixth logic signal sig6 in the second logic state ('L') as an input signal, the seventh logic signal sig7 is still in the second logic state ('L'). For the same reason, the eighth logic signal sig8 is also still in the second logic state ('L'). As a result, the first voltage signal out1, the second voltage signal out2, and the current over-voltage protection level OVPL are the second over-voltage protection level OVPL2 at the time t2. However, since the over-voltage protection reference voltage OVPR is still the fourth over-voltage protection level OVPL4, the over-voltage signal OV is also still in the second logic state ('L').

Since the over-voltage protection voltage OVP is lower than the current over-voltage protection level OVPL set to the second over-voltage protection level OVPL2 between the time t2 and the time t3, the second logic signal s2 is in the first logic state ('H'). Accordingly, the third logic signal sig3 is in the first logic state ('H') and the fifth logic signal sig5 is in the second logic state ('L'). However, since the first, second, and third flip-flops D1, D2, and D3 do not react a falling edge of the fifth logic signal sig5, the first voltage signal out1, the second voltage signal out2, and the current over-voltage protection level OVPL maintain their previous states.

At the time t3, the feedback voltage FB starts higher than the feedback reference voltage FBR, and thus, the first logic signal sig1 is in the first logic state ('H'), and the fourth logic signal sig4 is in the second logic state ('L'). Since, the second logic signal s2 is in the first logic state ('H'), the third logic signal sig3 maintains the first logic state ('H'). However, since the fifth logic signal sig5 transitions to the first logic state ('H') due to the fourth logic signal sig4, thereby generating a rising edge of the clock signal.

As a result, at the time t4, the seventh logic signal sig7 is in the first logic state ('H'), and the second voltage signal out2 and the current over-voltage protection level OVPL are the third over-voltage protection level OVPL3. In addition, the fourth selector S4 outputs the third over-voltage protection level OVPL3 as the over-voltage protection reference voltage OVPR due to the fourth logic signal sig4 that has transitioned to the second logic state ('L').

Since an output of the RS latch RS is not changed when both the set input terminal S and the reset input terminal R are in the second logic state ('L'), the fourth logic signal sig4 maintains the second logic state ('L'). Accordingly, even though the feedback voltage FB starts lower than the feedback reference voltage FBR at the time t5, or even though the feedback voltage FB starts higher than the feedback reference voltage FBR at the time t6, the fourth logic signal sig4 maintains the second logic state ('L').

In addition, since the fourth logic signal sig4 maintains the second logic state ('L') by the RS latch RS, the fifth logic signal sig5 always maintains the second logic state ('L') regardless of a logic state of the third logic signal sig3. Accordingly, the fifth logic signal sig5 does not generate a rising edge any more. Thus, the current over-voltage protection level OVPL is determined as the third over-voltage protection level OVPL3, and the over-voltage protection reference voltage OVPR is also determined as the third over-voltage protection level OVPL3.

At the time t7, the over-voltage protection voltage OVP starts higher than the over-voltage protection reference voltage OVPR determined as the third over-voltage protection level OVPL3. Accordingly, the over-voltage signal OV is in the first logic state ('H'), and an over-voltage state may be sensed by receiving the over-voltage signal OV.

Figure 13:
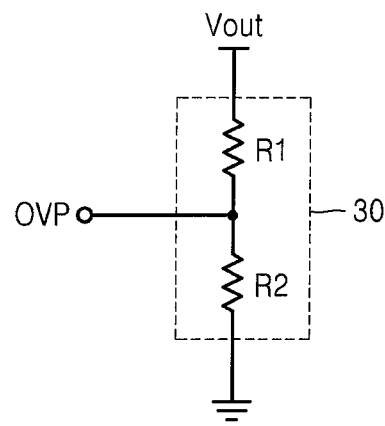
FIG. 13 is a circuit diagram of an over-voltage protection voltage generator shown in FIG. 1.

FIG. 13 is a circuit diagram of the over-voltage protection voltage generator 30 shown in FIG. 1.

Referring to FIG. 13, the over-voltage protection voltage generator 30 may include a first resistor R1 and a second resistor R2 connected in series between the output voltage Vout and the ground voltage GND. The over-voltage protection voltage generator 30 may be a voltage distributor.

In this case, the over-voltage protection voltage OVP may be directly proportional to the output voltage Vout. For example, the over-voltage protection voltage OVP may be 1/5 to 1/1000 times the output voltage Vout. A ratio of the over-voltage protection voltage OVP to the output voltage Vout may be properly determined, and the inventive concept is not limited to the above-disclosed ratios. The ratio of the over-voltage protection voltage OVP to the output voltage Vout may be determined so that a range which the over-voltage protection voltage OVP may have belongs to a range of the plurality of over-voltage protection levels OVPL1 to OVPLN.

The circuit diagram shown in FIG. 13 is an example, and the inventive concept is not limited to the above-described configuration. For example, the over-voltage protection voltage generator 30 may include a diode, a capacitor, or a combination of them.

Figure 14:
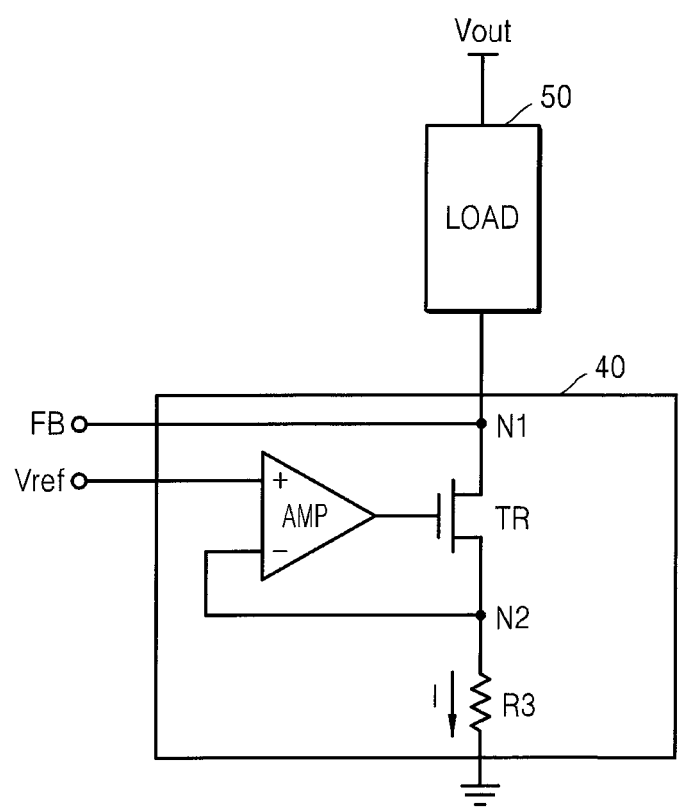
FIG. 14 is a circuit diagram of a feedback voltage generator shown in FIG. 1.

FIG. 14 is a circuit diagram of the feedback voltage generator 40 shown in FIG. 1.

Referring to FIGS. 1 and 14, the feedback voltage generator 40 is connected between the load 50 and the ground voltage GND. The feedback voltage generator 40 may include an amplifier AMP, a transistor TR, and a resistor R3.

A reverse input terminal of the amplifier AMP is connected to a second node N2, and a reference voltage Vref is applied to a non-reverse input terminal of the amplifier AMP. An output terminal of the amplifier AMP is connected to a gate of the transistor TR. The transistor TR includes a first terminal connected to a first node N1 and a second terminal connected to the second node N2. The resistor R3 is connected between the second node N2 and the ground voltage GND.

The reference voltage Vref may be previously set to a voltage higher than the feedback reference voltage FBR. If the output voltage Vout is 0 V, no current flows through the load 50 and the resistor R3, and thus, a voltage of the second node N2 is also 0 V. Since the voltage of the second node N2 is lower than the reference voltage Vref, the transistor TR turns on.

When the output voltage Vout starts increasing, the voltage of the second node N2 also increases if the load 50 is a resistive load. However, if the voltage of the second node N2 is higher than the reference voltage Vref, the transistor TR turns off, and the voltage of the second node N2 decreases to the reference voltage Vref. With this process, the voltage of the second node N2 is substantially identical to the reference voltage Vref. In this case, a current I flowing through the resistor R3 is substantially determined as Vref/R3. This current I is the same as a current flowing through the load 50. Thus, values of the reference voltage Vref and the resistor R3 may be previously set so that the current I is equal to the rated current of the load 50.

When the load 50 is a diode load, even though the output voltage Vout increases, the voltage of the second node N2 does not increase if the output voltage Vout is not higher than a total threshold voltage of the diode load. Thereafter, if the output voltage Vout is higher than the total threshold voltage of the diode load, the voltage of the second node N2 increases. However, like the resistive load, the voltage of the second node N2 is substantially identical to the reference voltage Vref due to the amplifier AMP and the transistor TR.

The feedback voltage FB is a voltage derived from the first terminal of the transistor TR, i.e., the first node N1. Thus, if the output voltage Vout reaches the range of the rated voltage of the load 50, the feedback voltage FB is higher than a predetermined voltage in response to the output voltage Vout. The predetermined voltage may be determined as the feedback reference voltage FBR.

While the inventive concept has been particularly shown and described with reference to exemplary embodiments thereof, it will be understood that various changes in form and details may be made therein without departing from the spirit and scope of the following claims.

What is claimed is:

1. An adaptive over-voltage protection circuit comprising:
an over-voltage protection reference voltage provider for determining an over-voltage protection reference voltage as a predetermined reference voltage of an over-voltage protection level by comparing a feedback signal corresponding to an output voltage supplied to a load with a feedback reference signal; and an over-voltage signal output unit for outputting an over-voltage signal indicating an over-voltage by comparing an over-voltage protection voltage corresponding to the output voltage with the over-voltage protection reference voltage.

2. The adaptive over-voltage protection circuit of claim 1, wherein the over-voltage protection reference voltage provider determines the over-voltage protection reference voltage as a voltage of an over-voltage protection level higher than and closest or second closest to that of the over-voltage protection voltage from among a plurality of different over-voltage protection levels.

3. The adaptive over-voltage protection circuit of claim 1, wherein the over-voltage protection reference voltage provider senses a time when the output voltage reaches a range of a rated voltage by comparing the feedback signal with the feedback reference signal and determines the over-voltage protection reference voltage when the output voltage reaches the range of the rated voltage.

4. The adaptive over-voltage protection circuit of claim 3, wherein the over-voltage protection reference voltage provider sequentially compares the over-voltage protection voltage with voltages of a plurality of over-voltage protection levels until the output voltage reaches the range of the rated voltage.

5. The adaptive over-voltage protection circuit of claim 1, wherein the over-voltage protection reference voltage provider comprises:
    a first comparison unit for receiving the feedback signal and comparing the feedback signal with the feedback reference signal;
    a second comparison unit for comparing the over-voltage protection voltage with a voltage of an over-voltage protection level currently output from a level output unit among a plurality of over-voltage protection levels;
    a clock generator for generating a clock signal based on an output signal of the first comparison unit and an output signal of the second comparison unit; and
    the level output unit for sequentially outputting the plurality of over-voltage protection levels one-by-one in response to the clock signal.

6. The adaptive over-voltage protection circuit of claim 5, wherein the over-voltage protection reference voltage provider further comprises an over-voltage protection reference voltage output unit for outputting a voltage of an over-voltage protection level currently output from the level output unit as the over-voltage protection reference voltage when a voltage of the feedback signal is higher than a voltage of the feedback reference signal while outputting a voltage of the highest over-voltage protection level among the plurality of over-voltage protection levels as the over-voltage protection reference voltage.

7. The adaptive over-voltage protection circuit of claim 5, wherein the clock generator generates the clock signal to have a rising or falling edge whenever the over-voltage protection voltage is higher than a voltage of an over-voltage protection level currently output from the level output unit.

8. The adaptive over-voltage protection circuit of claim 5, wherein the clock generator generates the clock signal to have a rising or falling edge when a voltage of the feedback signal is higher than a voltage of the feedback reference signal.

9. The adaptive over-voltage protection circuit of claim 5, wherein the clock generator generates the clock signal not to have a rising or falling edge any more when a voltage of the feedback signal is higher than a voltage of the feedback reference signal.

10. The adaptive over-voltage protection circuit of claim 5, wherein the clock generator comprises:
    a first logic gate for performing a NOR operation of an output signal of the first comparison unit and an output signal of the second comparison unit;
    a latch for latching the output signal of the first comparison unit; and
    a second logic gate for generating the clock signal by performing an AND operation of an output signal of the first logic gate and a reverse output signal of the latch.

11. The adaptive over-voltage protection circuit of claim 5, wherein the clock generator comprises:
    a first logic gate for performing an OR operation of an output signal of the first comparison unit and an output signal of the second comparison unit;
    a latch for latching the output signal of the first comparison unit; and
    a second logic gate for generating the clock signal by performing a NAND operation of an output signal of the first logic gate and a reverse output signal of the latch.

12. The adaptive over-voltage protection circuit of claim 5, wherein the level output unit comprises:
    a clock counter for receiving the clock signal and outputting a clock count signal by counting clocks of the clock signal; and
    a multiplexer for receiving the clock count signal and the plurality of over-voltage protection levels and outputting a voltage of an over-voltage protection level corresponding to the clock count signal among the plurality of over-voltage protection levels.

13. A power system comprising:
    a power supply unit for generating an output voltage supplied to a load;
    an over-voltage protection voltage generator, which is connected between the output voltage and a ground voltage and generates an over-voltage protection voltage corresponding to the output voltage;
    a feedback signal generator, which is connected between the load and the ground voltage and generates a feedback signal corresponding to the output voltage; and
    an adaptive over-voltage protection circuit comprising an over-voltage protection reference voltage provider for receiving the over-voltage protection voltage and the feedback signal and determining an over-voltage protection reference voltage as a predetermined voltage of an over-voltage protection level by comparing the feedback signal and a feedback reference signal and an over-voltage signal output unit for outputting an over-voltage signal indicating an over-voltage by comparing the over-voltage protection voltage with the over-voltage protection reference voltage.

14. The power system of claim 13, wherein the over-voltage protection voltage is proportional to the output voltage.

15. The power system of claim 13, wherein the feedback signal generator comprises:
    a transistor comprising a first terminal to which the load is connected and a second terminal to which a first node is connected;
    a resistor connected between the first node and a ground voltage; and
    an amplifier comprising a reverse input terminal to which the first node is connected, a non-reverse input terminal through which a reference voltage is input, and an output terminal connected to a gate of the transistor, and
    a voltage of the first terminal of the transistor is provided as a voltage of the feedback signal.

16. The power system of claim 13, wherein the over-voltage protection reference voltage provider determines the over-voltage protection reference voltage as a voltage of an over-voltage protection level higher than and closest or second closest to that of the over-voltage protection voltage from among a plurality of different over-voltage protection levels when a voltage of the feedback signal is higher than a voltage of the feedback reference signal.

17. The power system of claim 13, wherein the over-voltage protection reference voltage provider comprises:
- a first comparison unit for comparing the feedback signal with the feedback reference signal;
- a second comparison unit for comparing the over-voltage protection voltage with a voltage of an over-voltage protection level currently output from a level output unit among the plurality of over-voltage protection levels;
- a clock generator for generating a clock signal in response to an output signal of the first comparison unit and an output signal of the second comparison unit; and
- the level output unit for sequentially outputting the plurality of over-voltage protection levels one-by-one in response to the clock signal.

18. An adaptive over-voltage protection method comprising:
- a reference voltage providing operation of determining an over-voltage protection reference voltage as a predetermined voltage of an over-voltage protection level by comparing a feedback signal corresponding to an output voltage supplied with a load with a feedback reference signal; and
- an over-voltage signal outputting operation of outputting an over-voltage signal indicating an over-voltage by comparing an over-voltage protection voltage corresponding to the output voltage with the over-voltage protection reference voltage.

19. The adaptive over-voltage protection method of claim 18, wherein the reference voltage providing operation comprises:
- a preparation operation of receiving the over-voltage protection voltage and the feedback signal and generating a plurality of over-voltage protection levels and the feedback reference signal;
- an initialization operation of setting the lowest one of the plurality of over-voltage protection levels as a comparison level;
- a first comparison operation of comparing the feedback signal with the feedback reference signal;
- a second comparison operation of comparing the over-voltage protection voltage with a voltage of the over-voltage protection level set as the comparison level;
- a level resetting operation of resetting the second lowest one of the plurality of over-voltage protection levels as the comparison level; and
- a determination operation of determining a voltage of the over-voltage protection level set as the comparison level, as the over-voltage protection reference voltage.

20. The adaptive over-voltage protection method of claim 19, wherein, after the first comparison operation, if a voltage of the feedback signal is higher than a voltage of the feedback reference signal, proceeding to the determination operation, and if the feedback voltage is lower than the feedback reference voltage, proceeding to the second comparison operation, and after the second comparison operation, if the over-voltage protection voltage is higher than the voltage of the over-voltage protection level set as the comparison level, proceeding to the level resetting operation, and if the over-voltage protection voltage is lower than the voltage of the over-voltage protection level set as the comparison level, proceeding to the first comparison operation.

* * * * *